(12) United States Patent
Walker et al.

(10) Patent No.: US 6,208,978 B1
(45) Date of Patent: Mar. 27, 2001

(54) SYSTEM AND METHOD FOR ISSUING SECURITY DEPOSIT GUARANTEES BASED ON CREDIT CARD ACCOUNTS

(75) Inventors: Jay S. Walker, Ridgefield; Sanjay K. Jindal, Wilton; Daniel E. Tedesco, Monroe, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/932,984

(22) Filed: Sep. 18, 1997

(51) Int. Cl.[7] ................................. G06F 17/60
(52) U.S. Cl. ........................... 705/38; 705/35
(58) Field of Search ................. 705/1, 4, 5, 30, 705/34, 35, 38, 39, 40, 44, 45; 235/375, 379, 380, 381

(56) References Cited

U.S. PATENT DOCUMENTS

| | | | |
|---|---|---|---|
| 4,839,505 | 6/1989 | Bradt et al. | 235/381 |
| 4,951,308 | 8/1990 | Bishop et al. | 379/91.01 |
| 5,311,594 | 5/1994 | Penzias | 713/183 |
| 5,457,747 | 10/1995 | Drexler et al. | 713/186 |
| 5,485,519 | 1/1996 | Weiss | 713/185 |
| 5,583,760 | * 12/1996 | Klesse | 705/38 |
| 5,798,508 | * 8/1998 | Walker et al. | 235/380 |
| 5,850,599 | * 12/1998 | Seiderman | 455/406 |

OTHER PUBLICATIONS

"What is a Letter of Credit", info@cambtrade.com, Cambridge Trading Services Corporation (1997).

\* cited by examiner

*Primary Examiner*—Stephen R. Tkacs
(74) *Attorney, Agent, or Firm*—Kurt M. Maschoff; Dean Alderucci

(57) ABSTRACT

A system and process for issuing a security deposit guarantee includes and involves a data storage system storing information about a credit card account having an account owner, and an agreement between the account owner and another party. Also included and involved is a data processing system coupled to the data storage system that is operative to receive a request to issue a security deposit guarantee of a specified value, to issue the security deposit guarantee in accordance with agreement between the account owner and the other party, and to update the credit card account based on the security deposit guarantee. The system and process also manage a claim that subsequently may be made against the security deposit guarantee by the other party.

93 Claims, 16 Drawing Sheets

— 600

```
$1000   SECURITY DEPOSIT   $1000
              GUARANTEE
     GUARANTEED BY FIRST BANK AND TRUST
              CERTIFICATE # 987654
              TERM: 5/2/97-5/2/98
```

| CARDHOLDER | | LESSOR | |
|---|---|---|---|
| NAME | JOE SMITH | NAME | JOHN LANDLORD |
| ADDRESS | 4 MAIN ST. | ADDRESS | 2 MAIN ST. |
| | TOWN, CT | | TOWN, CT |
| | | MERCHANT ID | 88888 |

FIRST BANK AND TRUST CLAIM\* PROCESSING PHONE NUMBER: 1-800-555-5555
\*ALL CLAIMS MUST BE MADE WITHIN 30 DAYS AFTER END OF TERM

FIG. 3

| CARDHOLDER ACCOUNT NUMBER | EXPIRATION DATE | NAME | ADDRESS | PHONE NUMBER | TOTAL CREDIT LINE | AVAILABLE CREDIT LINE | SECURITY DEPOSIT GUARANTEE NUMBER |
|---|---|---|---|---|---|---|---|
| 5555-8888-9999-9874 | 9/99 | JOE SMITH | 4 MAIN ST, APARTMENT 6 TOWN, CT. | (203) 444-5555 | $2,000 | $1,233 | 987654 |
| 5555-9876-4563-6541 | 7/98 | BOB JOHNSON | 9 FUN ST, PLACE, NY. | (212) 111-2222 | $3,500 | $2,000 | 456789 |
| 5555-9999-8888-7777 | 12/99 | PAT JONES | 23 COOL ST, TOWN, CT. | (203) 444-2222 | $3,500 | $2,000 | 321654 321655 |

← 216

*R1
R2
R3

― 218

| MERCHANT ID NUMBER | MERCHANT NAME | MERCHANT ADDRESS | AGREEMENT NUMBER |
|---|---|---|---|
| 88888 | JOHN LANDLORD | 2 MAIN ST. TOWN, CT | 6532 |
| 99999 | HONDA FINANCE | 66 PINE ST. CITY, NY | 567-8888 |
| 11111 | CAR PHONE STORE | 98 5TH AVE CITY, NY | 321-4141 |

*R1 → (row 1)
R2 → (row 2)
R3 → (row 3)

FIG. 4

| SECURITY DEPOSIT GUARANTEE NUMBER | CREDIT CARD ACCOUNT NUMBER | MERCHANT ID NUMBER | SECURITY DEPOSIT GUARANTEE AMOUNT | TERM | MONTHLY FEE |
|---|---|---|---|---|---|
| 987654 | 5555-8888-9999-9874 | 88888 | $1000 | 5/2/97-5/2/98 | $10.00 |
| 456789 | 5555-9876-4563-6541 | 99999 | $2000 | 5/15/97-5/15/00 | $20.00 |
| 321654 | 5555-9999-8888-7777 | 11111 | $500 | 5/20/97-5/20/98 | $5.00 |
| 321655 | 5555-9999-8888-7777 | 99999 | $1000 | 6/1/97-6/1/99 | $10.00 |

$1000 SECURITY DEPOSIT $1000
GUARANTEE

GUARANTEED BY FIRST BANK AND TRUST

CERTIFICATE # 987654

TERM: 5/2/97-5/2/98

| CARDHOLDER | | LESSOR | |
|---|---|---|---|
| NAME | JOE SMITH | NAME | JOHN LANDLORD |
| ADDRESS | 4 MAIN ST. | ADDRESS | 2 MAIN ST. |
| | TOWN, CT | | TOWN, CT |
| | | MERCHANT ID | 88888 |

FIRST BANK AND TRUST CLAIM* PROCESSING PHONE NUMBER: 1-800-555-5555
*ALL CLAIMS MUST BE MADE WITHIN 30 DAYS AFTER END OF TERM

FIG. 6

|  | AGREEMENT NUMBER | TERM | MONTHLY FEE |
|---|---|---|---|
| *R1 → | 6532 | 1 YEAR | 1% |
| R2 → | 6533 | 2 YEARS | 1% |
| R3 → | 6534 | 3 YEARS | 0.9% |
| R4 → | 9989 | 4 YEARS | 0.75% |

SYSTEM AND METHOD FOR ISSUING SECURITY DEPOSIT GUARANTEES BASED ON CREDIT CARD ACCOUNTS

BACKGROUND OF THE INVENTION

1. Field of the Invention

The present invention relates to security deposits used to secure transactions. In particular it relates to security deposit guarantees which are based on credit card accounts.

2. Description of the Related Art

Consumers often wish to acquire property and services in the context of agreements that require the transfer of some form of collateral to a seller. Such collateral often takes the form of a security deposit. Security deposits typically are required by sellers (e.g., landlords, hotel operators, cellular telephone retailers and service providers, car leasing companies, etc.) in the context of reservations and agreements to mitigate risks associated with non-payment, contract non-compliance, or to ensure the safe return of property at the end of an agreement term.

For example, in the case of reservations for hotels, restaurants, and car rentals, consumers often are asked to deposit their credit card numbers to ensure that they will honor their reservations. Upon receiving a request for a reservation, a credit card processing merchant "freezes" or places a credit hold on part of a consumer's credit line by processing the amount of the reservation (e.g., an amount equal to an anticipated charge) as a conventional credit card authorization request. If the credit card processing merchant (e.g., a hotel) later wishes to claim the amount of the frozen credit line, the merchant submits the previously authorized charge slip (or other form of charge notice) to a credit card processor for deposit.

The above-described method of obtaining a security deposit by placing a freeze on a portion of the cardholder's available credit line suffers from severe shortcomings. On a routine basis, typically every seven days, credit card issuers invalidate all pre-processed authorizations and credit line freezes that have not matured into actual deposits of charges. Hence, such a freeze cannot be used for apartment or car rentals because the duration of such a lease is typically at least twelve months. Furthermore the freeze on the consumer's credit card account only remains in effect for as long as the credit card issuer allows regardless of whether the security of the freeze is still needed or not by the merchant. In other words, the time period or "term" of the credit line freeze is set independently of the agreement between the cardholder and the credit card processing merchant. Thus, a merchant has to determine when a particular freeze will lapse based upon the specific rules of each credit card issuer. When the freeze lapses, the merchant is forced either to obtain another freeze, or transfer property without any form of security.

In addition to credit card reservations based on credit line freezes, there are many other situations in which security deposits are required. Such other situations often require cash-based security deposit payments to be made prior to the transfer of property or other similar rights. In many instances, however, security deposit payments present sizable barriers to entry for many consumers. Every year millions of people are unable to move into new homes or buy or lease certain types of products because they are unable to make security deposit payments to landlords and other merchants. For example, a person may meet every landlord screening test in regard to the rental of a new apartment, but not be allowed to execute a lease agreement with the landlord because the person cannot make a security deposit payment equal to one or two month's rent. Additionally, many people are declined the rental of cellular telephones because they cannot make security deposit payments to a cellular telephone dealer to ensure the safe return of cellular equipment or the compliance with certain cellular telephone service contracts. Furthermore, while many prospective customers may be able to afford monthly lease payments associated with a new automobile, they are often unable to enter into an automobile lease agreement because they cannot make a security deposit payment equal to at least one extra car payment.

As such, the inability of many people to make cash-based security deposits has created a buying power problem. That is, by not having available resources to make a security deposit payment, a person is inhibited from acquiring good, services, or other property for which he would be able to afford monthly or periodic payments. Additionally, in the case that a person can make a security deposit payment, doing so results in transferring money that will be held in trust during the period that an underlying agreement (e.g., a lease agreement) remains in effect. Accordingly, a buying power problem is realized by those who are able to make a security deposit payment in that any funds held in trust by a landlord, for example, remain out of control and use of the customer.

As such, consumers have limited options aside from making cash-based security deposits in the context of agreements requiring the same. Such limited options include checks, personal loans from banks or private parties, and credit card cash advances. At best, checks allow consumers to post date a draft to a date on which the consumer's bank account will maintain funds sufficient to cover the draft amount. Merchants that accept such post-dated checks receive no guarantee that the same will ever be good or that the merchant will ever be able to receive the funds specified by the consumer's check. Accordingly, merchants who accept such post-dated checks run the risk of transferring property without any guaranteed form of security.

Although a personal loan from a bank can allow a consumer to make a security deposit payment, such a loan can be difficult to obtain. Banks are reluctant to loan money in the absence of collateral. Accordingly, a personal loan from a bank, especially for a tenancy interest in property, is not a practical option.

With checks and personal loans not being adequate cash alternatives that may be used to make a security deposit payment, many consumers turn to credit card cash advances. Such cash advances are well known and often are issued directly as cash payments from banking or other institutions or indirectly through convenience checks that subsequently may be used by cardholders to pay the [orders?] of recipients of their choice. Although quite popular, cash advances are not without their problems. For example, credit card issuers often charge interest rates or transaction fees for cash advances that are significantly higher than their regular interest rates. Such charges often result in large finance charges that are difficult for cardholders to bear in addition to them servicing the debt associated with the principal amount of their cash advances. Accordingly, the issuance of a cash advance often can require debt service that inhibits a cardholder from having available resources for other purchases and payments. If a cash advance is used by a cardholder to make a security deposit payment to a landlord, the cardholder loses all buying power associated with that cash, but remains obligated to pay it back over time and at a high interest rate. As such, advanced cash that is used to make a security deposit often remains unavailable for use by a cardholder until the term associated with the security deposit ends and the security deposit amount is returned to the cardholder who may then repay his credit bill. Accordingly, if the cardholder retains the security deposit amount as a balance on his credit card for any length of time, for example, for term of the lease, the security deposit may cost the cardholder a significant amount of money.

In the consumer marketplace, with the exception of checks, personal loans, and credit card cash advances, there are no other available cash alternatives that a consumer may use to make a security deposit payment in the absence of available cash resources. In looking to the commercial marketplace, however, merchants have used letters of credit and other similar security instruments for many years. Letters of credit are issued by banks on behalf of their customers. Such letters of credit involve a promise to pay a sum certain on the part of an issuer (usually the bank) to a third party possessing a draft or other demand-for-payment document if conditions listed in such letters of credit are met. Typically, a letter of credit will be requested by a buyer of goods for the benefit of a seller in the context of a purchase and sale type agreement. It is incumbent on the buyer and/or seller to include specific terms in a letter of credit as the letter of credit will be honored by an issuing bank based on the terms found therein and regardless of the terms of the underlying purchase and sale agreement.

Although they are used in place of cash to form the basis of agreements between merchants, letters of credit are not suited for use in the consumer marketplace, especially for making security deposits, for several reasons. First of all, letters of credit are difficult to obtain and require that the buyer make special arrangements with banks. Also, a security deposit agreement absolutely requires the consent of both parties involved, i.e. the lessee and the lessor. Letters of credit, however, require only an agreement between the buyer and the buyer's bank; the seller does not necessarily have to be involved in the agreement. Security deposits require an agreement between the lessor and the lessee so that the lessor can be assured access to the security deposit in the amount agreed to for the duration of the security deposit term. Furthermore, the conventional systems that facilitate the issuance of letters of credit are not enabled to maintain and ensure a security deposit relationship between a lessee and a lessor for a term and an amount that they agree to.

Thus, there exists a need for systems and processes which allow consumers to realize greater buying power without requiring debt service. Without such systems and processes, consumers will continue to be prevented from realizing better standards of living and from acquiring access to goods and services that require security deposits. To be effective, such systems and processes must enable consumers to utilize their credit card accounts without being burdened with excessive debt service that results from high finance charges associated with revolving and outstanding credit card balances.

SUMMARY OF THE INVENTION

It is a principal object of the present invention to provide new and improved systems and processes that facilitate the issuance of security deposit guarantees that are established based on credit card accounts.

More specifically, it is an object of the present invention to provide systems and methods that enable consumers to utilize their credit card accounts to obtain security deposit guarantees from their credit card issuers in accordance with private agreements (e.g., lease agreements, etc.) that are accepted by merchants such as landlords, cellular telephone companies, car dealerships, etc., in lieu of cash-based security deposit payments that traditionally have been required prior to the transfer of property or other similar rights.

For example, such systems and methods could be utilized to allow a credit card customer to enter into a lease agreement for an apartment with a landlord without requiring the credit card customer to make a cash-based security deposit payment. In this case, the credit card customer can request a security deposit guarantee from his credit card issuer. The request could include the submission of a copy of the lease agreement that is to involve the credit card customer and the landlord. The request also could include a proposed security deposit guarantee amount, for example, an amount equal to one month's rent. After reviewing the lease agreement and depending on a set of other parameters such as credit rating and the like (lending parameters), the credit card issuing company will establish a security deposit guarantee record in its systems and will issue a corresponding security deposit guarantee certificate to the credit card customer who will give this to the landlord. The security deposit guarantee will remain in effect during the term defined in the lease agreement.

In issuing the security deposit guarantee, the credit card issuing company may initiate a credit hold for a time period specified by the lease agreement. The credit hold may be equal to all or some portion of the proposed amount of the security deposit guarantee. Additionally, the credit card issuing company may charge the credit card customer a monthly or periodic fee to maintain the security deposit guarantee. In any case, the credit card customer can present the security deposit guarantee certificate to the landlord in lieu of a security deposit payment and thereafter take possession of the leased property. No funds are transferred to the landlord unless the landlord makes a claim against the credit card customer in accordance with the terms and conditions of the lease agreement (e.g., a claim for money to clean or repair the rented property at the end of the lease term). A claim is made by contacting the credit card issuing company that issued the security deposit guarantee certificate. If funds are transferred in accordance with a landlord's claim, an amount equal to the landlord's claim will then be charged to the credit card customer's account as a coventional charge.

In accordance with the present invention, there are provided new and improved systems and processes that enable consumers to enter into agreements with third parties that require security deposits. More specifically, the invention enables consumers to seek security deposit guarantees from their credit card issuers which may thereafter be presented to merchants in lieu of conventional security deposit payments. The consumer thus realizes the benefits of entering into an agreement with a merchant (e.g., a lease for a new apartment) and, in one embodiment, registering a security deposit guarantee with his credit card issuer that may be used with the merchant, for example, a landlord, in lieu of a cash-based security deposit payment. The invention will thus enable consumers to have greater access to property, products, and services that have heretofore not been attainable due to personal cash-flow limitations.

The present invention achieves its objects and renders the aforementioned benefits by providing a system and process for issuing a security deposit guarantee that includes and involves a data storage system that stores information about a credit card account having an account owner and an agreement including terms and conditions between the account owner and another party. Also included and involved is a data processing system coupled to the data storage system that is operative to receive a request to issue a security deposit guarantee of a specified value, to issue the security deposit guarantee in accordance with the terms and conditions of the agreement between the account owner and the other party, and to update the credit card account based on the security deposit guarantee.

In another aspect of the present invention, the aforementioned system and processes allows an available credit line corresponding to a credit card account to be locked in accordance with an amount corresponding to a value specified in a request for a security deposit guarantee.

Another aspect of the present invention includes the provision of a process for accepting a security deposit guarantee issued by a credit card account issuer that includes the steps of requesting a security deposit of a specified value and receiving a security deposit guarantee in lieu of the security deposit from a cardholder. The security deposit guarantee is secured by a lock of a predetermined value against an available line of credit corresponding to a credit card account belonging to the cardholder and that is maintained by the credit card account issuer.

According to yet another aspect of the present invention, included is a process for obtaining a security deposit guarantee that includes the steps of establishing a credit card account having an available line of credit with a credit card issuer, requesting a security deposit guarantee having a specified value from the credit card issuer, receiving the security deposit guarantee from the credit card issuer, and providing the security deposit guarantee to the third party in lieu of a security deposit and in accordance with an agreement. The security deposit guarantee is to be generated by the credit card issuer in accordance with the agreement that is to be formed between a cardholder corresponding to the credit card account and a third party. The available line of credit is decreased by the specified value when the security deposit guarantee is issued by the credit card issuer and increased when the term of the agreement calling for the security deposit has ended.

According to yet another aspect of the present invention, a system for issuing a security deposit guarantee is provided that includes a data storage system storing information about a predefined agreement requiring a security deposit, and a data processing system that is coupled to the data storage system. The data processing system is operative to receive a request to issue a security deposit guarantee in accordance with the predefined agreement. The request includes an agreement identifier identifying the predefined agreement and an account identifier identifying an account. The data processing system is further operative to issue the security deposit guarantee in accordance with the predefined agreement, and to cause the account to be updated based on the security deposit guarantee.

Finally, according to another aspect of the present invention, a system and a method are provided to manage a claim that may be made against a previously issued security deposit guarantee.

BRIEF DESCRIPTION OF THE DRAWINGS

The present invention is described in detail below with reference to the following drawing figures of which:

FIG. 3 is a chart illustrating the CARDHOLDER DATABASE table identified in FIG. 2;

FIG. 4 is a chart illustrating the MERCHANT DATABASE table identified in FIG. 2;

FIG. 5 is a chart illustrating the SECURITY DEPOSIT GUARANTEE DATABASE table identified in FIG. 2.

FIG. 6 is an embodiment of a security deposit guarantee certificate that is processed and routed within the system depicted in FIG. 1.

FIG. 11 is a chart illustrating the AGREEMENT DATABASE table identified in FIG. 10;

DETAILED DESCRIPTION OF THE INVENTION

Figure 1:
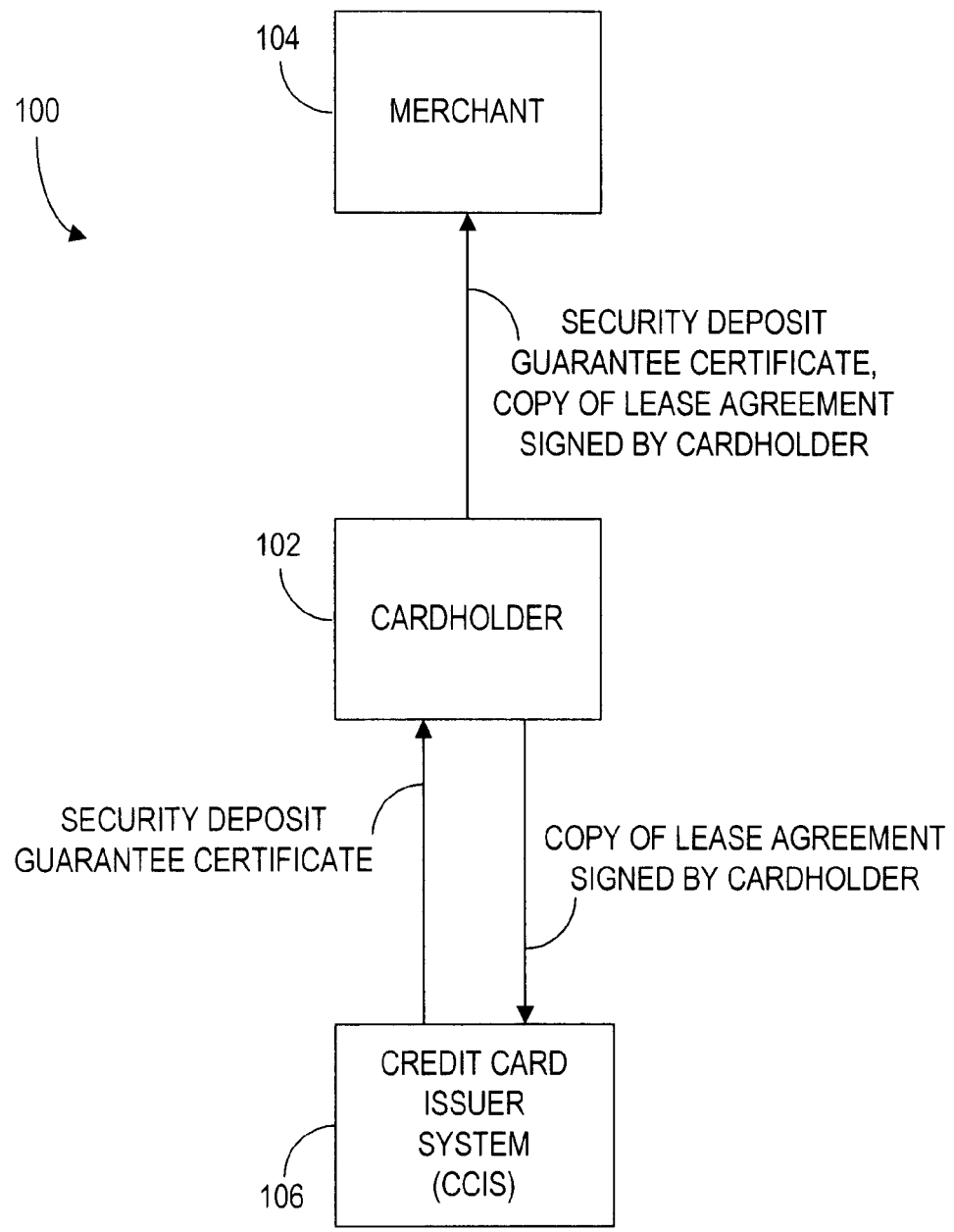
FIG. 1 is a block diagram of a system according to a first embodiment of the present invention.

In this section, the present invention is described in detail with regard to the drawing figures briefly described above. Additionally, the following terms are used throughout the remainder of this section. For purposes of construction, such terms shall have the following meanings:

The term "merchant," unless otherwise specified below, means any person or entity that requires a security deposit to be established as a condition precedent to the transfer of property or other interest via an agreement (term defined below). For example, a landlord of an apartment building normally may require a security deposit in the form of a cash payment to be made by a tenant prior to the landlord's execution of a lease agreement and prior to the tenant taking possession of the rented property. Additionally, a merchant would include a cellular telephone dealer and/or service provider, and a car dealer who normally leases automobiles.

The term "security deposit," unless otherwise specified below, means the pledge of property, money, or some additional obligation of a debtor or tenant to secure an obligation. Such a security deposit, as indicated above with regard to the definition of the term "merchant," would include money that a tenant deposits with a landlord to assure the landlord that the tenant will abide with the terms and conditions of an appropriate lease agreement. A security deposit also represents a fund from which the landlord may obtain payment for damages caused by the tenant during his occupancy of the property that was leased or rented.

The term "security deposit guarantee," unless otherwise specified below, means a promise to pay an amount which is guaranteed by a third party and which is contingent upon an event occurring in the future. Generally, a security deposit acts as a promise by a tenant to a landlord that the former will pay for damages to rented property that may occur during a lease term. In the context of the present invention, the tenant's promise is made in the form of a security deposit guarantee that is guaranteed by a third party such as a credit card issuer or bank who will pay a specified amount to the landlord in the event that the tenant fails to make such payment. The security deposit guarantee will be provided to the landlord in the form of a security deposit guarantee certificate (defined below) that is obtained from a credit card issuer. If the tenant fails to fulfill his lease obligations or otherwise wastes the rented property, the landlord may submit a claim against the credit card issuer in accordance with the security deposit guarantee to obtain monies from the credit card issuer as security deposit money. A certificate containing a security deposit guarantee is illustrated in FIG. 6 and is discussed in detail below.

The term "security deposit guarantee certificate," unless otherwise specified below, means an written instrument (e.g., a paper form, an electronic communication such as electronic mail, etc.) that contains a security deposit guarantee. As noted above, a security deposit guarantee certificate is shown in FIG. 6 and is discussed in detail below.

The term "agreement," unless otherwise specified below, means any form of contract between private parties concerning a transfer of property for which a form of security is required by one of the parties to ensure contract compliance and/or safe return of transferred property. An agreement would include a lease agreement between a landlord and a tenant. Additionally, an agreement would include a cellular telephone contract wherein service provider provides a cellular telephone at a reduced cost in conjunction with a service contract between the service provider and a customer. The term "agreement" may be preceded by another term such as "lease" to specify the exact nature of the agreement that requires a security deposit. The use of such other terms is not intended to limit the present invention. Any use of such other terms throughout the remainder of this section is intended to be exemplary as any agreement that requires security is contemplated by the present invention.

The aforementioned and defined terms are used below to describe the embodiments of the present invention. Unless otherwise indicated, like parts are referred to with like reference numerals.

A First Embodiment

The following paragraphs describe a first embodiment of a system in which security deposit guarantees are issued and managed for the benefit of credit card consumers (cardholders) and merchants. The first embodiment of the present invention allows cardholders to obtain security deposit guarantees from their credit card issuers in lieu of having to make a cash-based or cash equivalent security deposit payment in the context of any form of agreement normally requiring the same.

Referring now to FIG. 1, depicted therein is a block diagram of a system for allowing a cardholder to obtain a security deposit guarantee from his credit card issuer for the benefit of both the cardholder and a merchant who requires a corresponding security deposit. In particular, system 100 includes and involves a cardholder 102, a merchant 104, and a credit card issuer system ("CCIS") 106. CCIS 106 is a typical credit card issuer system that includes manual and automatic data processing systems that enable the issuance and management of credit card accounts.

The interconnections and corresponding flow of information between cardholder 102, merchant 104, and credit card issuer system 106 are discussed in detail below with reference to the flowcharts illustrated in FIGS. 7A, 7B, 7C, 8A, and 8B.

Figure 2:
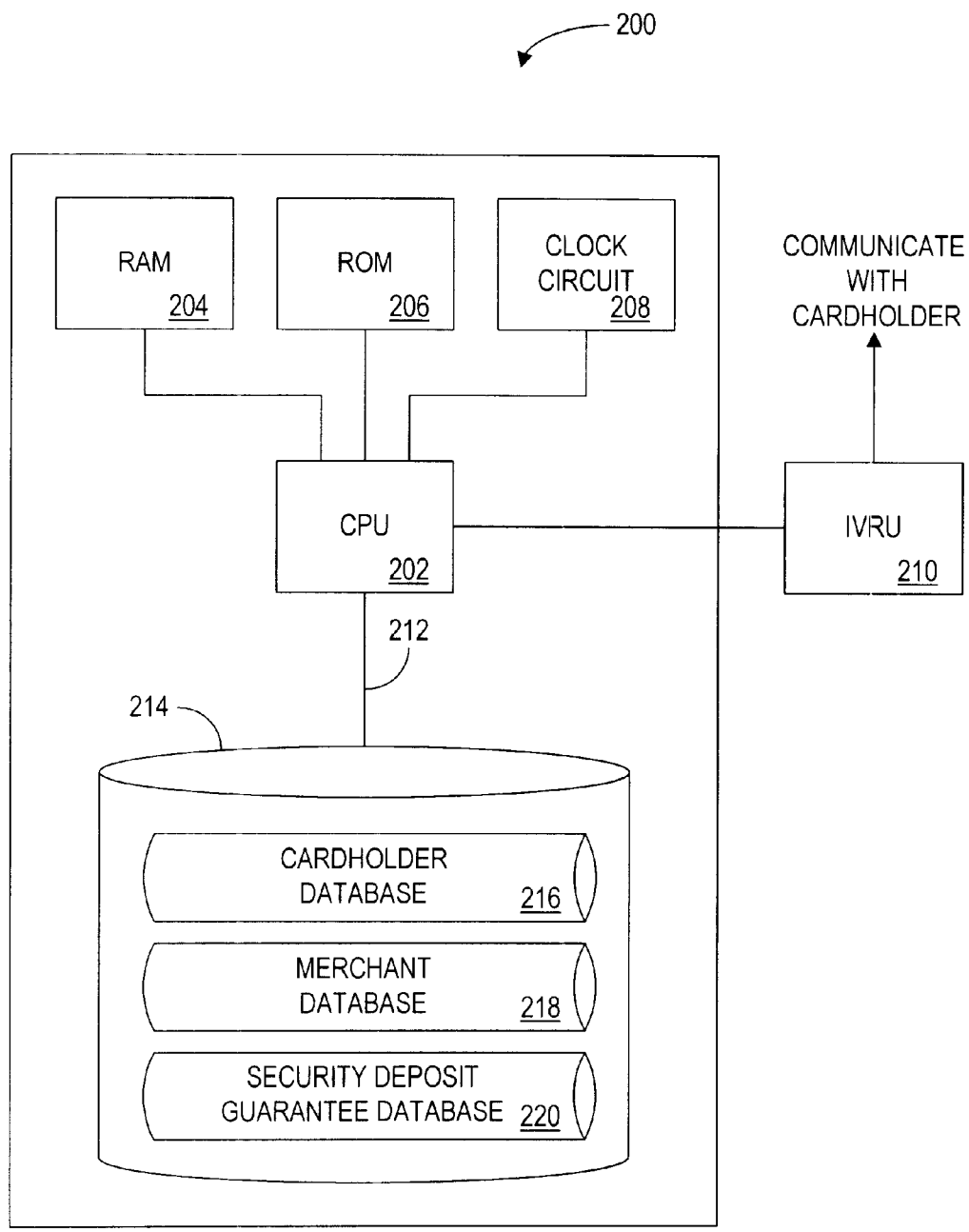
FIG. 2 is a block diagram of a data processing system maintained by the credit card issuer system shown in FIG. 1.

Referring now to FIG. 2, depicted therein is an automatic central controller system 200 (hereinafter "system 200") that is operated by credit card issuer system 106. In particular, system 200 includes a CPU 202, a RAM 204, a ROM 206, a CLOCK CIRCUIT 208, an interactive voice response unit (IVRU) 210, and a data storage device 214. Interactive voice response unit 210 is configured to communicate with cardholder 102 as illustrated in FIG. 1. Data storage device 214 is a typical magnetic disc based storage device, or equivalent storage system, that is configured to maintain and store database tables which allow certain functionality provided by the present invention. In particular, data storage device 214 maintains and stores a CARDHOLDER DATABASE 216, a MERCHANT DATABASE 218, and a SECURITY DEPOSIT GUARANTEE DATABASE 220. These database tables are discussed in detail below with regard to FIGS. 3, 4, and 5.

The interconnections and flow of data among the component parts forming system 200 will be readily apparent to those skilled in the art. For example, CPU 202 and data storage device 214 are coupled together via link 212 which will be readily understood to be a data transfer structure such as a bus or direct memory access architecture. In any case, system 200 is a conventional data processing system such as an automatic computer data processing system manufactured by SUN MICROSYSTEMS, INC. (e.g., the SUN SPARC 1000 system running the SOLARIS operating system).

It should also be understood that system 200 and its component parts are illustrative of a typical data processing system. System 200 will most likely include other component parts such as a printing sub-systems (e.g., laser printer units, etc.) and data storage sub-systems (e.g., CD-ROM storage units), etc. that are capable of performing specialized operations (e.g., printing of forms, reports, etc.). Accordingly, the interconnections of such sub-systems to the component parts forming system 200 will be readily understood by those skilled in the art of computer design and implementation.

The following paragraphs describe the database tables that are used in the present invention to allow users such as cardholder 102 to obtain security deposit guarantees in the context of agreements requiring the same. The database tables depicted in FIGS. 3, 4, and 5, are embodiments and are intended to be operational in a computerized data processing system adapted to manage table relationships established by common fields, proper table joins, and related queries. In particular, a relational database management system is well-suited to manage the flow of information within a system such as within credit card issuer system 106 and system 200, and the processing of data and tables illustrated in FIGS. 3, 4, and 5. Preferably, the database management system that is used to manage the tables illustrated in FIGS. 3, 4, and 5 is the ORACLE 7 database management system produced by the ORACLE CORPORATION or a product of similar function. Of course, many changes and alterations may be made to such tables to effect certain functionality depending on particular design requirements. Such changes and alterations will be apparent to those skilled in the art of computer programming and database management system design and implementation. Moreover, the use of a database management system like the ORACLE 7 database management system will be readily apparent to those skilled in the art of database design and implementation.

In addition to the foregoing comments, certain records in the database tables depicted in FIGS. 3, 4, and 5 have asterisks next to their record identifiers. The asterisks are intended to identify the records among the tables that are related to each other, and are meant to illustrate the benefits associated with the present invention.

Referring now to FIG. 3, depicted therein is a database table for storing records related to cardholders having credit card accounts that are established with credit card issuer system 106 (FIG. 1) and which are managed by system 200. CARDHOLDER DATABASE table 216 (hereinafter "table 216") has a column and row arrangement whereby columns define fields and rows define records. In table 216 there are eight columns. In particular, the columns are identified as CARDHOLDER ACCOUNT NUMBER, EXPIRATION DATE, NAME, ADDRESS, PHONE NUMBER, TOTAL CREDIT LINE, AVAILABLE CREDIT LINE, CREDIT RATING, and SECURITY DEPOSIT GUARANTEE NUMBER. Table 216 has three records (R1–R3) stored therein.

In table 216, record R1 has been marked with an asterisk to indicate that it is related to other records in other tables as described below. Record R1 pertains to CARDHOLDER ACCOUNT NUMBER 5555-8888-9999-9874 which expires in September, 1999, and which belongs to Joe Smith living at 4 Main Street, Apartment 6, Town, Conn. The account number is intended to identify a credit card number corresponding to Joe Smith's credit card account. As such, Joe Smith's credit card account had a total credit line of $2,000. As a result of card use, Joe Smith is currently carrying a credit card balance thus leaving an available credit line of $1,233. Additionally, the SECURITY DEPOSIT GUARANTEE NUMBER column indicates that Joe Smith has requested and obtained a security deposit guarantee that was issued by credit card issuer system 106 and which bears an identification number of 987654.

Records R2 and R3 have the same record format as record R1 and indicate similar information related to other cardholders and accounts which are managed by credit card issuer system 106 and system 200. Accordingly, for the purpose of brevity, a detailed review of Records R2 and R3 is omitted.

Referring now to FIG. 4, depicted therein is MERCHANT DATABASE 218 (hereinafter "table 218") which is stored in data storage system 214 of system 200. Table 218 has a column and row arrangement whereby columns form the fields and rows form the records. In particular, table 218 has four columns that store information about MERCHANT ID NUMBERs, MERCHANT NAMEs, MERCHANT ADDRESSes, and AGREEMENT NUMBERs.

In table 218, record R1 has been marked with an asterisk next to its record identifier to indicate that it is related to other records in other tables as discussed in detail in the following paragraphs. Record R1 stores information related to a merchant having a MERCHANT ID NUMBER 88888 and a MERCHANT NAME of JOHN LANDLORD. The merchant is located at 2 Main Street in Town, Conn. Additionally, the merchant has registered a standard lease agreement with credit card issuer system 106 which has an AGREEMENT NUMBER of 6532. Such a standard lease agreement is discussed below with regard to a second embodiment that is illustrated in FIGS. 9–12B. In this case, JOHN LANDLORD represents a landlord who controls a rental property such as an apartment unit in an apartment building. Additionally, JOHN LANDLORD regularly leases apartments to tenants that execute appropriate lease agreements and who are expected to secure the safety and integrity of such apartments through tendering a security deposit to JOHN LANDLORD prior to the starting date of such lease agreements. In the context of the present invention, JOHN LANDLORD can now accept a security deposit guarantee offered by a particular tenant (e.g., Joe Smith from table 216) which is guaranteed by credit card issuer system 106 or a banking or other type of institution that operates system 200.

Records R2 and R3 have the same record format as record R1 and indicate similar information related to other merchants about which data is maintained by system 200. Accordingly, for purposes of brevity, a detailed review of records R2 and R3 is omitted.

Referring now to FIG. 5, depicted therein is SECURITY DEPOSIT GUARANTEE DATABASE 220 (hereinafter "table 220") which is managed by system 200 as shown in FIG. 2. Table 220 has a column and row arrangement wherein columns form the fields and rows form the records. In particular, Table 220 stores information about SECURITY DEPOSIT GUARANTEE NUMBERs, CREDIT CARD ACCOUNT NUMBERs, MERCHANT ID NUMBERs, SECURITY DEPOSIT GUARANTEE AMOUNTs, TERMs, and MONTHLY FEEs.

In Table 220, record R1 has been marked with an asterisk next to its record identifier to indicate that it is related to other records in other tables as discussed below. Moreover, record R1 stores information related to a security deposit guarantee issued by credit card issuer system 106. The security deposit guarantee has a SECURITY DEPOSIT GUARANTEE NUMBER of 987654 which relates to CREDIT ACCOUNT NUMBER of 5555-8888-9999-9874. Through cross-reference to table 216, that account number belongs to Joe Smith (see table 216 at record R1). The security deposit guarantee has a SECURITY DEPOSIT GUARANTEE AMOUNT of $1,000 and covers a time period specified in the TERM column from May 2, 1997 through May 2, 1998. Joe Smith will be charged a monthly fee in accordance with a pricing scheme adopted by credit card issuer system 106 for the issuance of the $1,000 SECURITY DEPOSIT GUARANTEE. In this case, the fee equals 1% of the security deposit amount of $1,000.00 or $10.00 per month. The SECURITY DEPOSIT GUARANTEE AMOUNT also acts as a maximum claim value should a merchant (e.g., a landlord, a car dealer, a cellular telephone dealer/service provider, etc.) desire to make a claim against the security deposit guarantee for an amount up to the total value of the SECURITY DEPOSIT GUARANTEE AMOUNT specified in table 220. The fees assessed can vary by issuer. Additionally, should a dispute arise in relation to the security deposit guarantee issued in accordance with record R1, Joe Smith could be charged a dispute fee which can also vary by issuer. It should also be noted that like the dispute fee, if a cardholder decides after issuance of a security deposit guarantee that he will transfer his credit card balance to another credit card, a processing fee or the entire security deposit guarantee amount may be charged to the cardholder's credit card account. In this way, the issuance of security deposit guarantees according to the present invention can act as a cardholder retention tool. A cardholder will be less likely to transfer to another card if he first has to pay off a security deposit guarantee amount before any transfer may occur. Such a DISPUTE FEE column can be simply added to table 220 if corresponding functionality is desired during implementation of the present invention.

Records R2, R3, and R4 have the same record format as record R1 and indicate similar information related to other security deposit guarantees about which system 200 stores information. Accordingly, for purposes of brevity, a detailed review of records R2 through R4 is omitted.

Referring now to FIG. 6, depicted therein is a security deposit guarantee certificate 600 according to the present invention. Security deposit guarantee certificate 600 is a paper form which is issued by credit card issuer system 106 at the request of cardholder 102 or in accordance with a request from a merchant as indicted in relation to the second embodiment illustrated in FIGS. 9–12B as discussed below.

Security deposit guarantee certificate 600 includes a face amount of $1,000, has a security deposit guarantee number of 987654, and is enforceable throughout the term May 2, 1997 until May 2, 1998. Security deposit guarantee certificate 600 has been issued on behalf of and at the request of cardholder Joe Smith and is intended to be presented to a lessor by the name of JOHN LANDLORD. The term specified on security deposit guarantee certificate 600 is specified in accordance with the underlying lease agreement (e.g., the "lease term" of a lease agreement for the rental of an apartment unit) between Joe Smith and JOHN LANDLORD. In the event that Joe Smith wastes or otherwise does not fulfill, in this case, his tenant obligations as defined in the agreement, John Landlord may make a claim to credit card issuer system 106 within 30 days after the end of the term described above. Such a claim could be equal to an amount up to $1,000. In the event that such a claim is made, the $1,000 (or the actual amount of the claim up to $1,000), would be charged to Joe Smith's credit card and credit card issuer system 106 will cause a payment to be made to John Landlord. Accordingly, security deposit guarantee certificate 600 is intended to be accepted as an instrument in lieu of a cash payment to provide JOHN LANDLORD with an adequate assurance of security and lease agreement compliance.

It is important to note that security deposit guarantee certificate 600 may take many forms. Although the preferred approach is to issue a paper based security deposit guarantee certificate, the present invention certainly contemplates the use of other types of instruments such as electronic document interchange formats which will allow security deposit guarantees to be issued electronically between a credit card issuer and a cardholder or between a credit card issuer and a merchant directly.

Additionally, it is important to note that although it is preferred to have credit card issuer system 106 produce and distribute security deposit guarantee certificate 600 directly to cardholder 102, the present invention is not so limited. It is quite possible to couple credit card issuer system 106 and cardholder 102 and his personal computing station (e.g., a personal computer running a network browser client or even a kiosk type station located in a mall, etc.) via a network such as the Internet and world wide web. In such a case, cardholder 102 would be able to visit a web site (or other network interface such as a screen from an online service like AOL or COMPUSERV) and request the download of text and/or graphics that may be received by cardholder 102's personal computing station and printed out on a laser or ink-jet printer such as one manufactured by HEWLETT PACKARD. In such a case, the system 100 in FIG. 1 would need to be altered by adding a remote processing station to the block identified as cardholder 102. Such remote operation including the remote printing of documents downloaded from a network server computer will be readily apparent to those skilled in the art. Accordingly, it should be appreciated that the present invention certainly contemplates remote production (e.g., printing) of security deposit guarantee certificates like security deposit guarantee certificate 600.

The system shown in FIGS. 1 and 2 including the database tables illustrated in FIGS. 3, 4, and 5 in conjunction with security deposit guarantee certificate 600 as shown in FIG. 6, have been designed to operate together. Accordingly, the flowcharts illustrated in FIGS. 7A, 7B, 7C, 8A, and 8B which are described below illustrate the steps carried out by many of the structures described above in managing and processing the aforementioned database tables to allow cardholders to obtain security deposit guarantees and corresponding certificates in the context of agreements requiring the same.

Figure 7A:
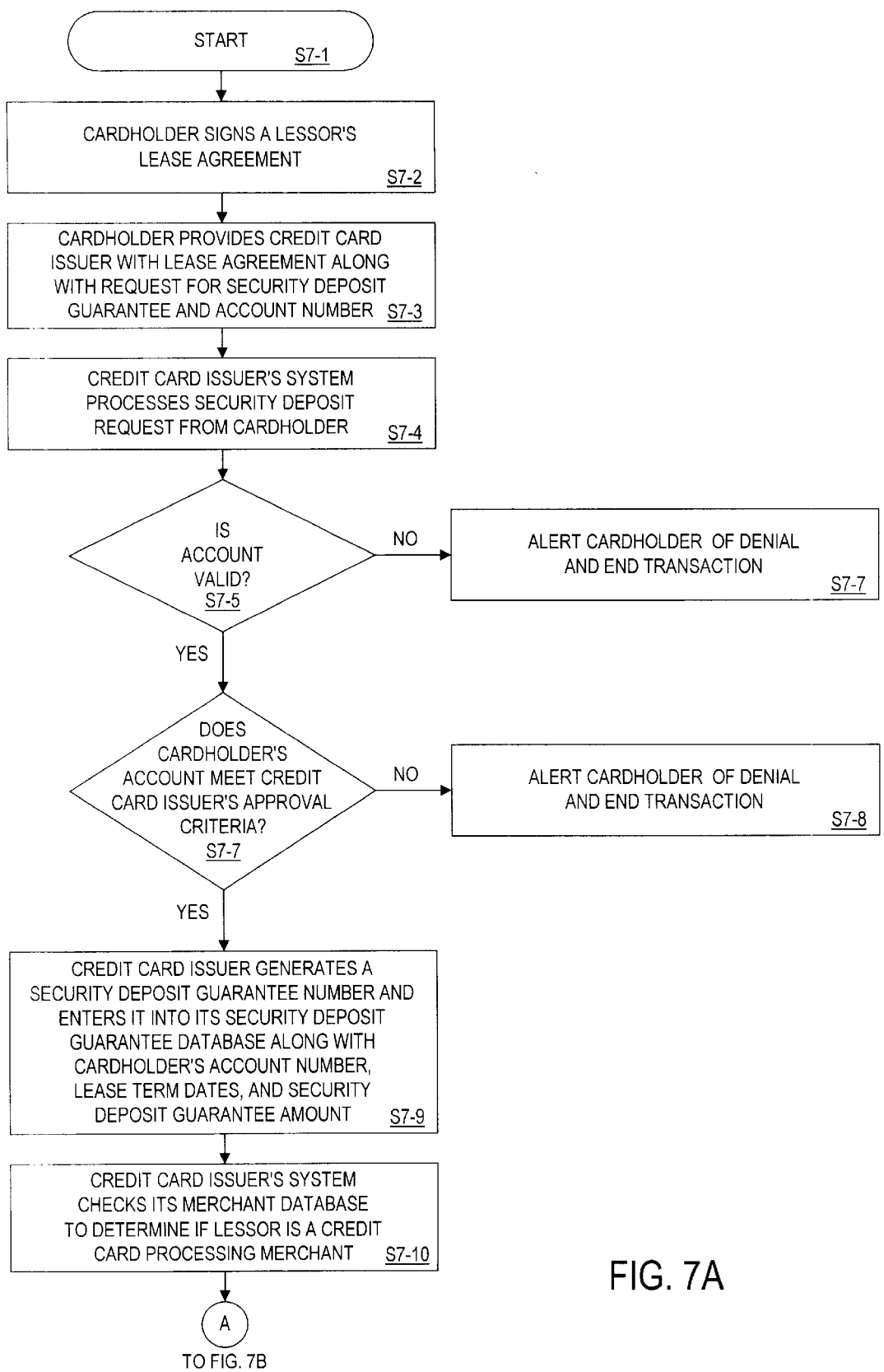
FIG. 7A is a flowchart illustrating a process for registering security deposit guarantee certificates within the embodiment illustrated in FIG. 1.
Figure 7B:
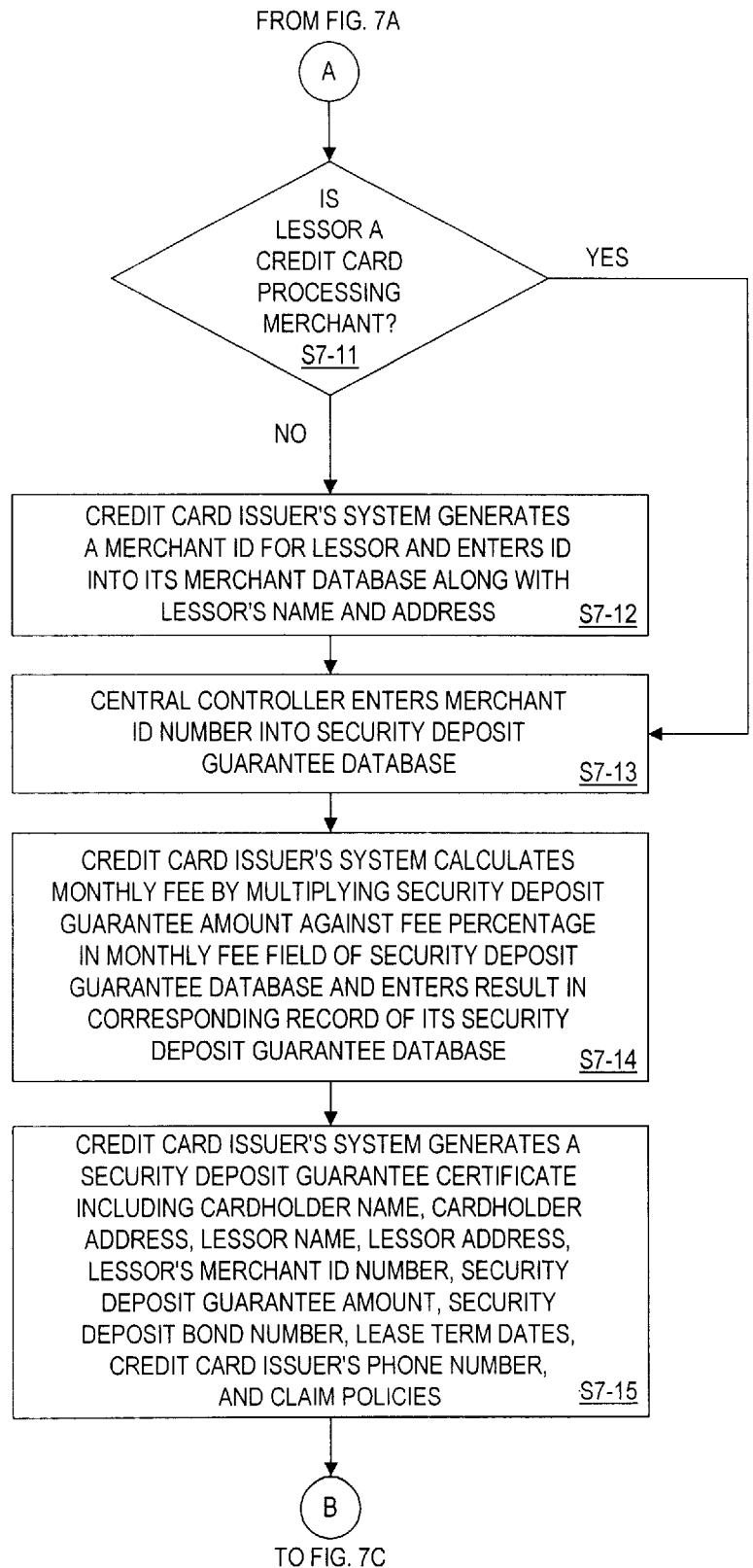
FIG. 7B is a continuation of the flowchart started in FIG. 7A.
Figure 7C:
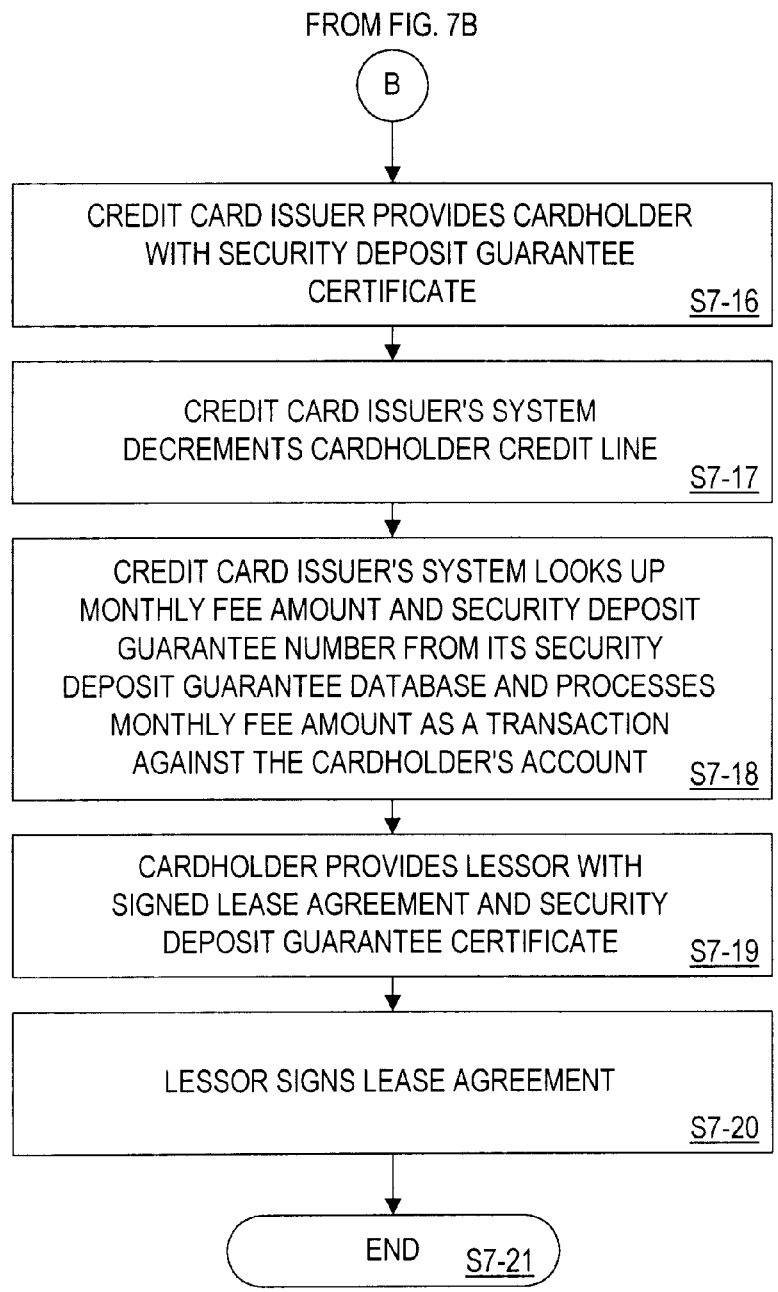
FIG. 7C is the conclusion of the flowchart started in FIG. 7A.

Referring now to FIGS. 7A, 7B, and 7C, depicted therein is a flowchart illustrating a security deposit guarantee issuance and registration process carried out within system 100 according to a embodiment of the present invention. In particular, processing starts at Step S7-1 and immediately proceeds to Step S7-2 where a cardholder receives and signs a lessor's lease agreement. The lease agreement includes a provision requiring the cardholder to put forth or pay a security deposit in regard to the leased property contemplated by the lessor's lease agreement. According to the present invention, however, the lessor will receive from the lessee (in this case, the cardholder) a security deposit guarantee (in the form of certificate as shown in FIG. 6) backed and guaranteed by the resources of the cardholder's credit card issuing bank or credit card issuer.

After the cardholder signs the lessor's lease agreement, processing proceeds to Step S7-3, where the cardholder provides a copy of the lease agreement to the credit card issuer system along with the cardholder's account number and a request for the issuance of a security deposit guarantee certificate of a specified value. Thereafter, at Step S7-4 the credit card issuer system processes the security deposit guarantee request from the cardholder.

At Step S7-5 the credit card issuer system will determine if the cardholder's account number is valid by checking its cardholder database (FIG. 3—Table 216). If the account number is not valid, the cardholder will be notified of a denial and the transaction will terminate at Step S7-6.

If the account number is valid as determined at Step S7-5, processing then proceeds to Step S7-7. At Step S7-7 the credit issuer system will determine if the cardholder's account meets the credit issuer system's approval criteria to issue a security deposit guarantee and corresponding guarantee certificate of a requested specified value. This determination may be carried out by having personnel review a proposed lease or other type of agreement and by having a system such as system 200 automatically review appropriate database records. In any case, depending on the extent of the review that is made, either manual or automatic processing or both may be utilized. If the determination yields a negative result, processing proceeds to Step S7-8 where the cardholder will be notified of a denial for the security deposit guarantee and the transaction will terminate.

If the cardholder's account meets the approval criteria as determined at Step S7-7, processing proceeds to Step S7-9.

The approval criteria for generating a security deposit guarantee number will vary with different credit card issuers. Generally, a credit card issuer will confirm that the card has not expired, that the account is in good standing, that the account is not past due, that the card is not a lost or stolen card, and that sufficient credit line is available to decrement (or lock against) to issue a security deposit guarantee. At step S7-9, the credit card issuer system generates a security deposit guarantee number and enters it into its SECURITY DEPOSIT GUARANTEE DATABASE (FIG. 5—Table 220) along with the cardholder's account number, the lease agreement term, and the security deposit guarantee amount. Thereafter, processing proceeds to Step S7-10.

At Step S7-10, the credit card issuer system checks its MERCHANT DATABASE (FIG. 4—Table 218) to determine if the lessor is a credit card processing merchant. Processing then proceeds to Step S7-11 at the top of FIG. 7B.

At Step S7-11, the credit card issuer system determines if the lessor is a credit card processing merchant. If not, the credit card issuer system generates a merchant ID for the lessor and enters that ID into its MERCHANT DATABASE (FIG. 4—Table 218) along with the lessor's name and address. Accordingly, the present invention is not restricted to merchants that are preexisting or pre-registered credit card processors. To the contrary, any merchant may take full advantage of the present invention by merely accepting security deposit guarantee certificates generated by credit card issuers.

If, at Step S7-11, the merchant is determined to be a credit card processing type merchant, processing then proceeds to Step S7-13 where the credit card issuer system enters the merchant ID number into its SECURITY DEPOSIT GUARANTEE DATABASE as illustrated in FIG. 3 (table 216).

Next, at Step S7-14, the credit card issuer system calculates a monthly fee by multiplying the security deposit guarantee amount by a fee percentage in the monthly fee field of the SECURITY DEPOSIT GUARANTEE DATABASE (FIG. 5—Table 220) and enters the result in the corresponding record thereof. Thereafter, at Step S7-15, the credit card issuer system generates a security deposit guarantee certificate (FIG. 6) including the cardholder' name, the cardholder's address, the lessor's name, the lessor's address, the lessor's merchant ID number, the security deposit guarantee amount (e.g., a maximum claim value), the security deposit guarantee number, the lease term, the credit card issuer's phone number, and certain security deposit claim policies and practices.

Processing thereafter proceeds to Step S7-16 at the top of FIG. 7C. At Step S7-16, the credit card issuer system provides the cardholder with the security deposit guarantee certificate illustrated in FIG. 6. The security deposit guarantee certificate may be sent to the cardholder by mail or overnight express courier. Additionally, as noted above, the security deposit guarantee certificate may also be issued electronically in the form of an electronic data interchange (EDI) document or by other electronic means such as a message sent via the worldwide web or via electronic mail.

Next, at Step S7-17, if preferred, the credit card issuer system may decrement the cardholder's available credit line based on the security deposit guarantee amount or some other amount based on processing parameters specified by the credit card issuer, for instance, the cardholder's credit rating, risk score, credit score, or profitability score. At this point, there is no requirement that a corresponding charge to the cardholder's account be made. In this way, the security deposit guarantee protects the lessor from the contingent event that the lessee (the cardholder) wastes or otherwise leaves the lessor with a liability related to the rented or leased property. Of course, it should also be noted that decreasing a cardholder's line of credit need not necessarily be done by the credit card issuer system; to contrary, if after reviewing a lease agreement, for example, and after reviewing parameters such as the cardholder's credit score and other parameters such as profitability and risk scores (as are commonly done in the credit issuance industry), the credit card issuer may merely charge a periodic fee (e.g., a monthly fee) or even a one-time fee for issuing the security deposit guarantee.

At Step S7-18, the credit card issuer system looks up the monthly fee amount and security deposit guarantee number from its SECURITY DEPOSIT GUARANTEE DATABASE (FIG. 5—Table 220) and processes them as a transaction against the cardholder's account. This transaction will result in a charge against the cardholder's credit card account. Thereafter, processing proceeds to Step S7-19 where the cardholder provides the lessor with a signed lease agreement and a security deposit guarantee certificate as illustrated in FIG. 6.

At Step S7-20, the lease agreement is counter-signed by the lessor and processing thereafter proceeds and ends at Step S7-21.

It should be noted that at step S7-13, the credit card issuer could send an approval code to the merchant authorizing the release of goods, or services to the cardholder. The approval code could be transmitted over telephone or any communications network to the merchant. In the case of standard lease agreements containing standard terms and conditions known to the credit card issuer the entire security deposit guarantee approval process could take a short amount of time to complete, with the actual documentation following later.

Figure 8A:
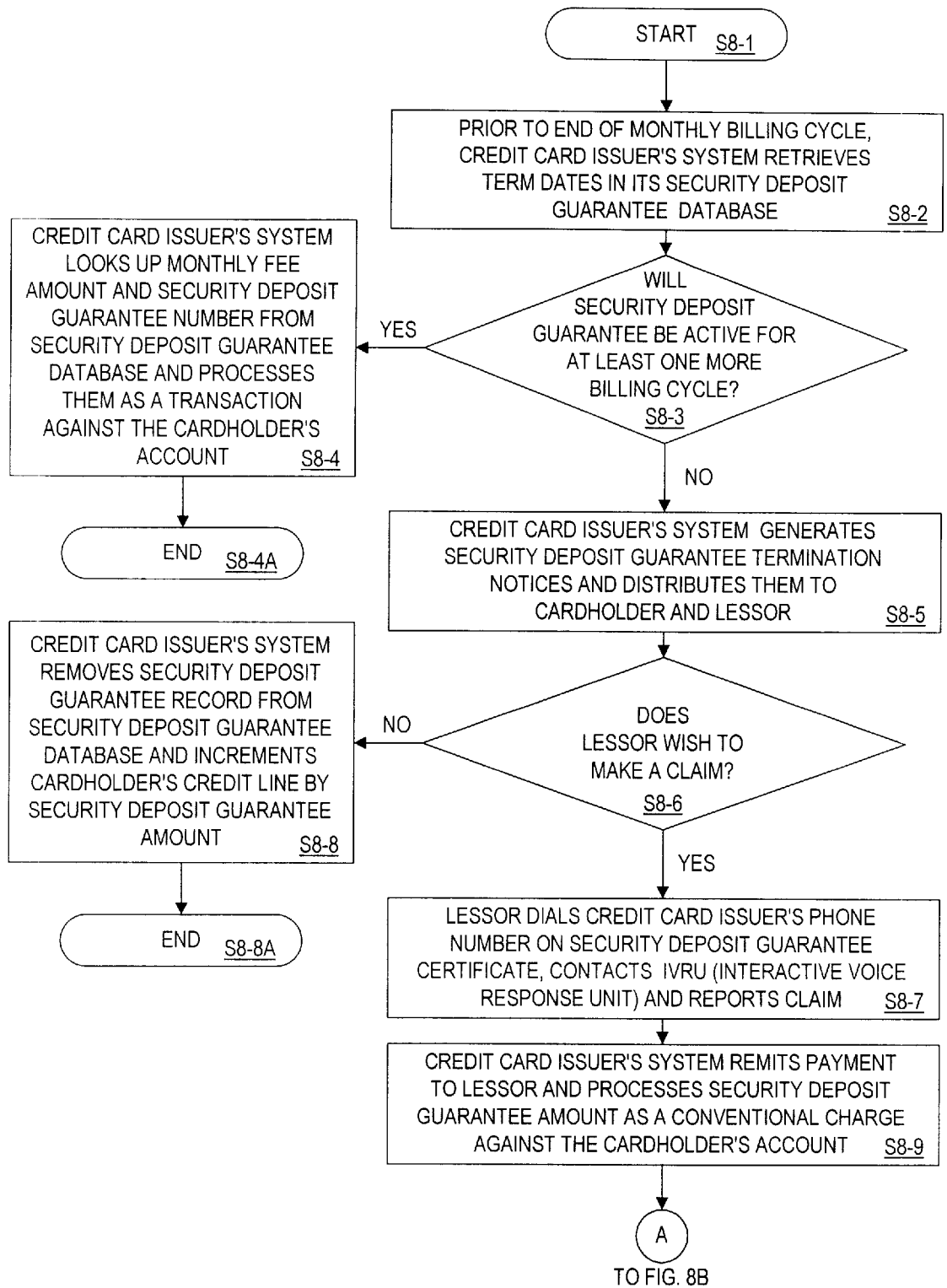
FIG. 8A is a flowchart illustrating a process for managing a monthly billing cycle and the end-of-term operations (e.g., claims made against previously issued security deposit guarantees) carried out by the credit card issuer system depicted in FIGS. 1 and 2.
Figure 8B:
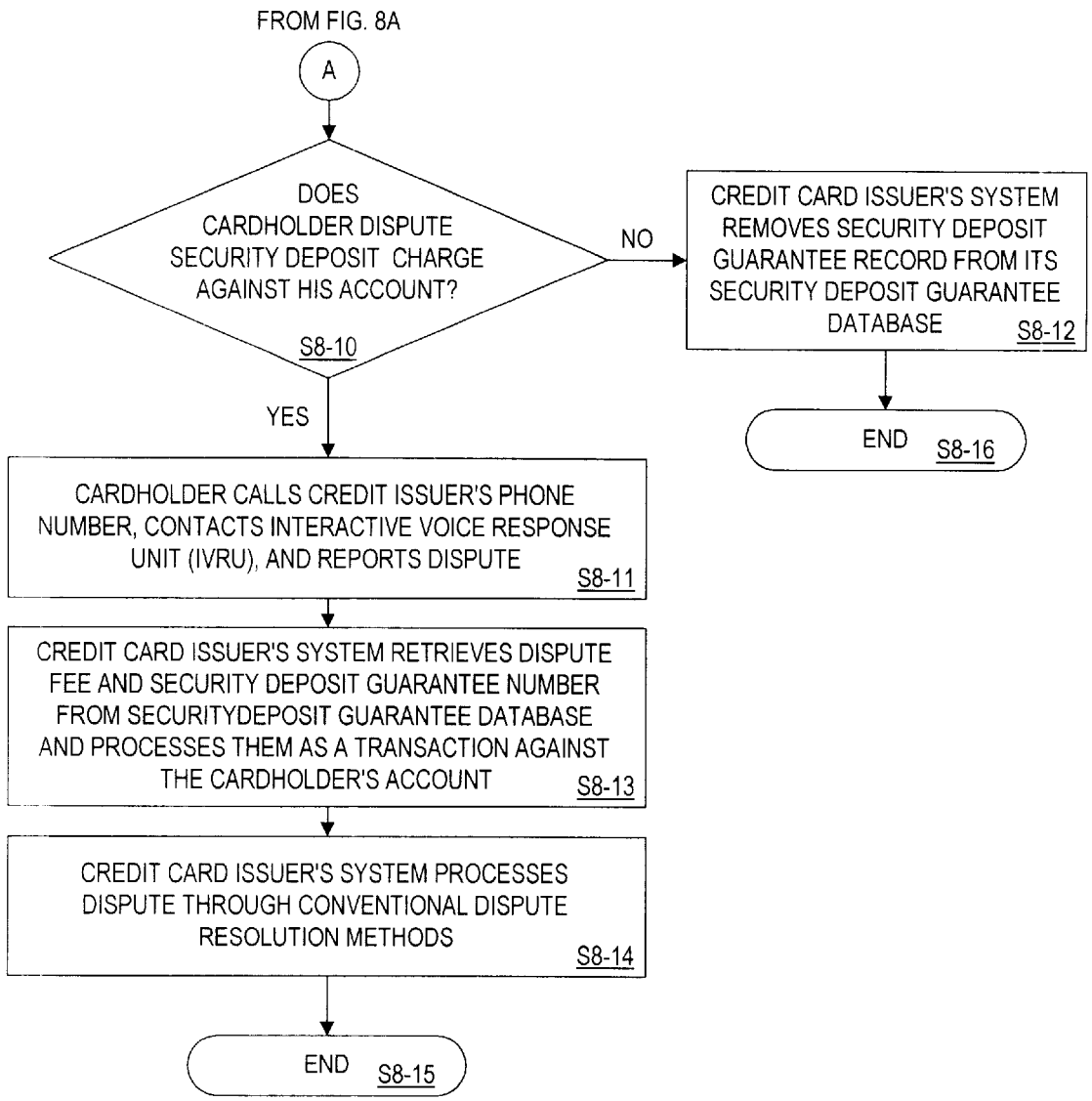
FIG. 8B is the conclusion of the flowchart started in FIG. 8A.

Referring now to FIGS. 8A and 8B, therein depicted is a flowchart illustrating the operations carried out during a monthly billing cycle and end-of-term process by the system depicted in FIG. 1 according to a embodiment of the present invention. In particular, processing starts at the top of FIG. 8A at Step S8-1 and immediately proceeds to Step S8-2.

At Step S8-2, and prior to the end of the monthly billing cycle, the credit card issuer system retrieves term dates from it SECURITY DEPOSIT GUARANTEE DATABASE (FIG. 5—Table 220).

Processing then proceeds to Step S8-3, where a determination is made as to whether or not a particular security deposit guarantee (as determined by iterative processing of the records in the credit card issuer system's SECURITY DEPOSIT GUARANTEE DATABASE (table 220—FIG. 5)) will be active (i.e., enforceable or payable) at least one more billing cycle. If so, the credit card issuer system looks up the monthly fee amount and the security deposit guarantee number from its SECURITY DEPOSIT GUARANTEE DATABASE (FIG. 5—Table 220) and processes the same as a transaction against the cardholder's account. Thereafter, processing proceeds to Step S8-4-A and terminates.

If, at Step S8-3, the security deposit guarantee will not be active at least one more billing cycle, processing proceeds to Step S8-5. At Step S8-5, the credit card issuer system generates the security deposit guarantee termination notices and distributes them to the cardholder and, possibly, to the lessor. Thereafter, processing proceeds to a determination at Step S8-6.

At Step S8-6, the credit card issuer system will determine whether or not the lessor desires to make a claim against the security deposit guarantee certificate. If not, the credit card issuer system, at Step S8-8, removes the security deposit guarantee record from its SECURITY DEPOSIT GUARANTEE DATABASE (FIG. 5 Table—220) and increments the cardholder's credit line by the security deposit guarantee amount thereby effectively removing an earlier placed hold or lock upon the cardholder's credit card available line of credit, if the same was caused to occur. See e.g., FIG. 7C at Step S7-17 and the discussion of the same above. Thereafter, processing proceeds to and terminates at Step S8-8-A.

If, at Step S8-6, the lessor desired to make a claim against the security deposit guarantee certificate, processing proceeds to Step S8-7 where the lessor may dial the credit card issuer's telephone number as printed on the security deposit guarantee certificate (as illustrated in FIG. 6) to contact a voice response unit such as an interactive voice response unit (IVRU) to report the lessor's claim. Thereafter, processing proceeds to Step S8-9.

At Step S8-9, the credit card issuer system remits payment to the lessor against the appropriate security deposit guarantee and processes the security deposit guarantee amount (or the amount of the lessor's claim less than or equal to the security deposit guarantee amount) as a conventional charge against the cardholder's credit card account. Thereafter, processing proceeds to Step S8-10 at the top of FIG. 8B.

At Step S8-10, the credit card issuer system will evaluate whether the cardholder desires to dispute the security deposit charge against his credit card account. If not, processing proceeds to Step S8-12 where the credit card issuer system will remove the security deposit guarantee record from its SECURITY DEPOSIT GUARANTEE DATABASE (FIG. 5—Table 220). Thereafter, processing proceeds to and ends at Step S8-16.

If at Step S8-10, the cardholder intends to dispute the security deposit charge against his credit card account, processing proceeds to Step S8-11. At Step S8-11, the cardholder calls the credit card issuer system's telephone number to contact an interactive voice response unit (IVRU) and to report the dispute.

Thereafter, processing proceeds to Step S8-13 where the credit card issuer system retrieves the dispute fee and the security deposit guarantee number in its SECURITY DEPOSIT GUARANTEE DATABASE (FIG. 5—Table 220) and processes the same as a transaction against the cardholder's credit card account.

Next, processing proceeds to Step S8-14 where the credit card issuer system processes the dispute through conventional dispute resolution methods.

Processing ends at Step S8-15.

A Second Embodiment

The following paragraphs describe a second embodiment of the present invention which is illustrated, in part, in FIGS. 9–12B. The second embodiment incorporates many of the structures and processes described above, but is intended to be utilized to facilitate the issuance of security deposit guarantees in the context of standard agreements at a point of sale (POS) location such as at a point of sale station at a cellular telephone dealer or at a car dealer. Cellular telephone service contracts, auto lease agreements and other similar lease agreements often have standard terms and conditions that, among other things, call for security deposits. As such, based on the second embodiment, a merchant simply has to input a security deposit amount and an identifier into a POS terminal to signal to a receiving issuer (e.g., credit card issuer system 106) that a transaction is a security deposit type transaction in the context of a standard agreement. The merchant can then add a merchant identifier and a standard agreement number to the transaction data that is to be transmitted by the merchant to the issuer system.

Once received by a credit card issuer system, a determination can be made as to whether the cardholder's credit card account meets the issuer's approval criteria before issuing a security deposit guarantee. If the approval criteria are met, a draft containing a security deposit obligation notice may be received and manifested at the point of sale.

Only those structures and processes that are additional and/or different from those described above with regard to the first embodiment are discussed below.

Figure 9:
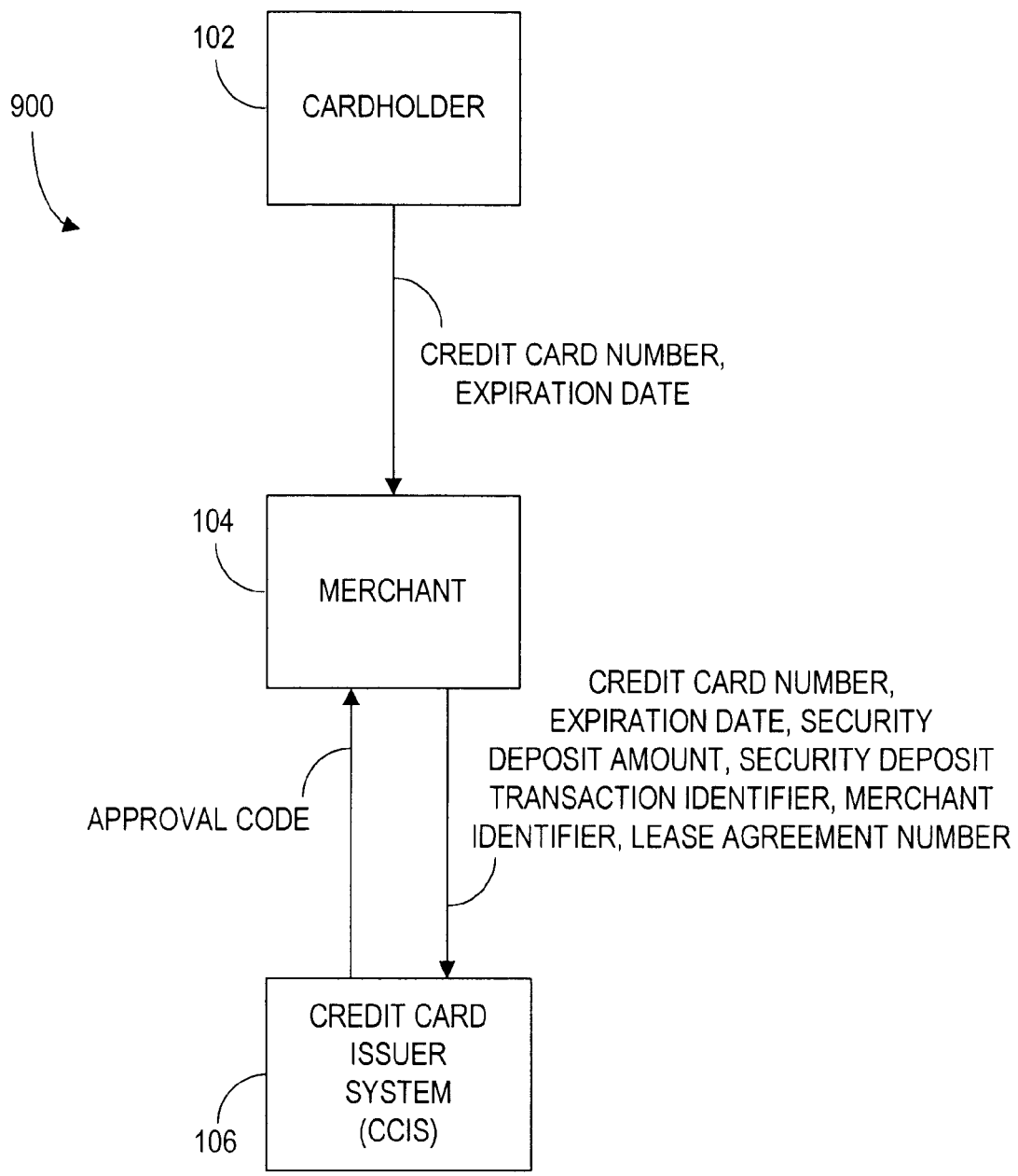
FIG. 9 is a block diagram of a system according to a second embodiment of the present invention.

Referring now to FIG. 9, depicted therein is a block diagram of a system for allowing a merchant to automatically obtain a security deposit guarantee from a credit card issuer for the benefit of both a cardholder and the merchant. In particular, system 900 includes and involves cardholder 102, merchant 104, and credit card issuer system ("CCIS") 106. In contrast to system 100 depicted in FIG. 1, system 900 is structured so that cardholder 102's interaction with credit card issuer system 106 is through merchant 104 and any systems that merchant 104 may operate. Accordingly, the interconnections and corresponding flow of information between cardholder 102, merchant 104, and credit card issuer system 106 are discussed in detail below with reference to the flowcharts illustrated in FIGS. 12A and 12B.

Figure 10:
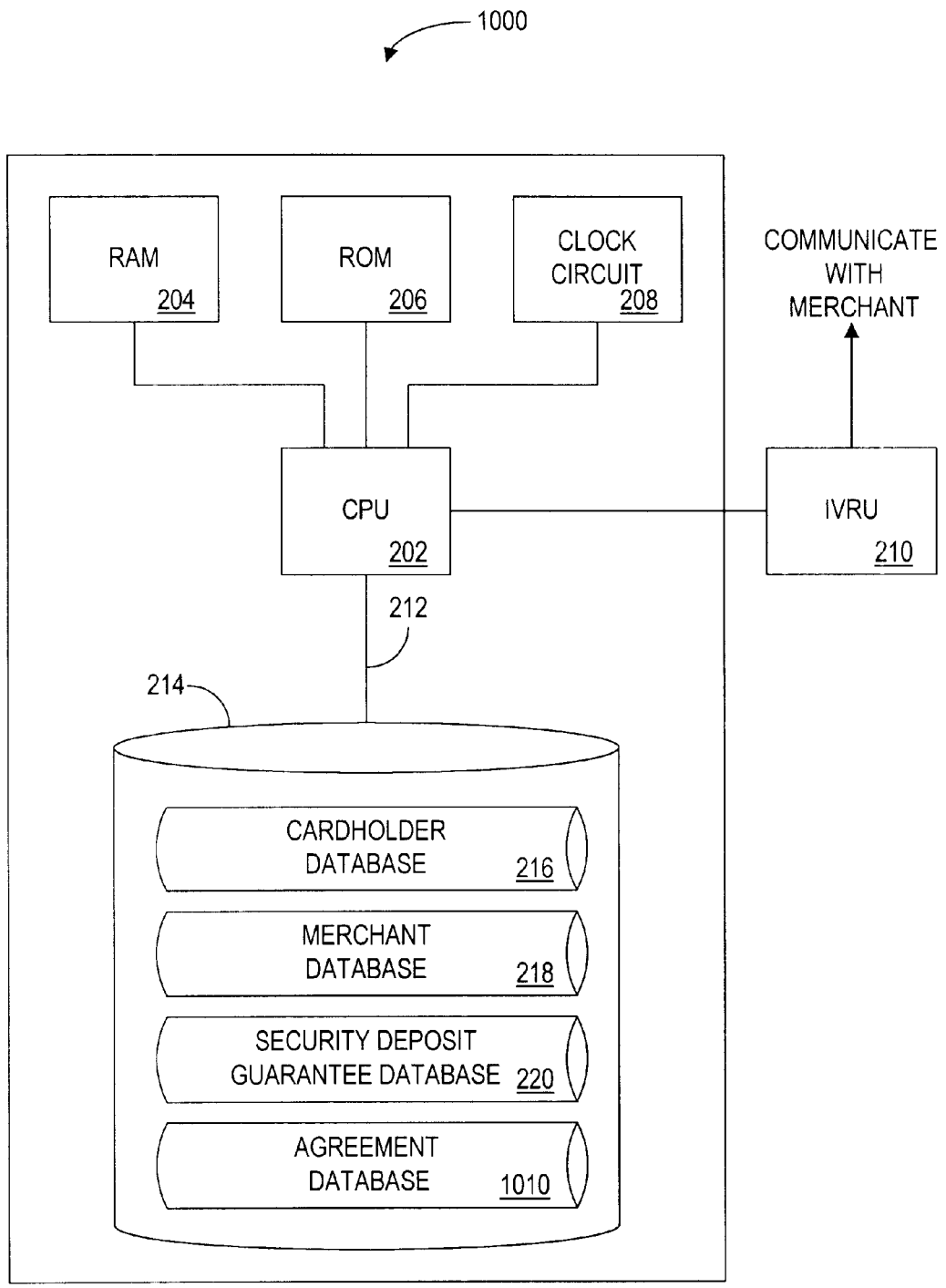
FIG. 10 is a block diagram of a data processing system maintained by the credit card issuer system shown in FIG. 9.

Referring now to FIG. 10, credit card issuer system 106 has been modified relative to the first embodiment in that it has been equipped with a central controller system 1000 (hereinafter "system 1000") which has been configured to communicate with merchant 104 and any systems merchant 104 may operate. Additionally, system 1000 includes an additional database referred to as AGREEMENT DATABASE 1010.

Referring now to FIG. 11, depicted therein is a database table corresponding to AGREEMENT DATABASE 1010 for storing records related to agreements that are processed by system 1000 within system 900. In particular, AGREEMENT DATABASE table 1010 (hereinafter "table 1010") has a column and row arrangement whereby columns define fields and rows define records. In table 1010, there are three columns respectively identified as AGREEMENT NUMBER, TERM, and MONTHLY FEE. Table 1010 has four records (R1–R4) stored therein.

In table 1010, record R1 has been marked with an asterisk to indicate that it is related to other records in other tables as described below. In particular, record R1 pertains to a lease agreement issued by merchant 104 (i.e., JOHN LANDLORD as indicated in table 218—tables 101 and 218 are related by common field AGREEMENT NUMBER) having a AGREEMENT NUMBER 6532, a TERM of 1 year, and a corresponding MONTHLY FEE of 1%. The agreement issued by JOHN LANDLORD is a standard one that may be used to rent many apartment units. Accordingly, credit card issuer system need only necessarily review the terms and conditions of the lease agreement once, if it desires. The MONTHLY FEE column/field is intended to indicate the fee that merchant 104 may charge for issuing the lease agreement.

Records R2–R4 have the same record format as record R1 and indicate similar information related to other lease agreements which are managed by credit card issuer system 106 within system 900. Accordingly, for purpose of brevity, a detailed review of Records R2 and R3 is omitted.

The following paragraphs describe the operation of the structure of the second embodiment. In particular, the flowchart illustrated in FIGS. 12A and 12B outlines the steps carried out by many of the structures described above in issuing and managing the aforementioned database tables to allow cardholders and merchants to take advantage of security deposit guarantees in the context of agreements requiring the same.

Figure 12A:
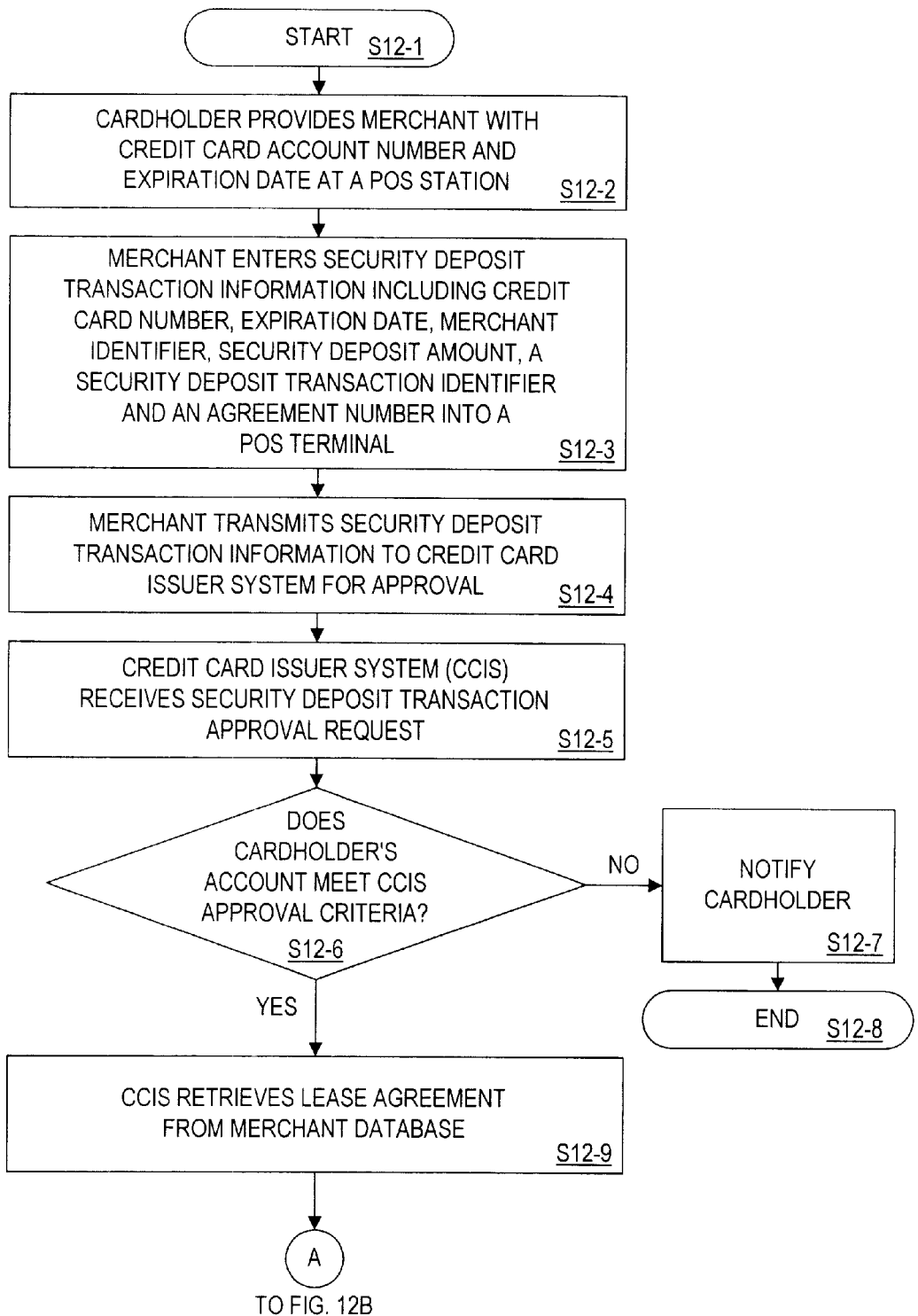
FIG. 12A is a flowchart illustrating a process for issuing security deposit guarantees within the system depicted in FIG. 9.

In FIG. 12A, processing starts at Step S12-1 and immediately proceeds to Step S12-2 where a cardholder provides a merchant with a credit card account number and its expiration date. The cardholder may provide such information to the merchant in the context of a POS transaction involving the lease of an apartment, a car, or other property such as a cellular telephone. In any case, however, after the cardholder approaches a sales clerk or agent at a POS station a security deposit guarantee may be automatically and expeditiously issued within system 900.

Next, at Step S12-3, the merchant enters security deposit transaction information including the cardholder's credit card number and expiration date, a merchant identifier, a security deposit amount, a security deposit transaction identifier (for example, an * or # sign to signal to the CCIS that the upcoming transaction is a security deposit guarantee transaction), and an agreement number into a POS terminal. And, at Step S12-4, such entered information is transmitted to a credit card issuer system such as CCIS 106 for processing and approval.

Thereafter, at Step S12-5, the credit card issuer system will receive the security deposit transaction information from the merchant.

Next, at Step S12-6, a determination is made by the credit card issuer system as to whether the cardholder's account (e.g., credit card account), meets certain approval criteria (e.g., account not past due, available credit line, valid card). If not, processing proceeds to Step S12-7 where the cardholder will be so notified (e.g., via a POS terminal, via oral communication from the merchant to the cardholder, via written communication, or via electronic means such as e-mail delivered after the cardholder leaves the POS station at the merchant's facilities). Thereafter, processing ends at Step S12-8.

If, at Step S12-6, the cardholder's account meets the CCIS' approval criteria (i.e., the credit card issuer system is willing to issue and back a security deposit guarantee), processing proceeds to Step S12-9. At Step S12-9, the credit card issuer system automatically retrieves terms and conditions for the agreement from its AGREEMENT DATABASE (FIG. 10—Table 1010 as described above).

Figure 12B:
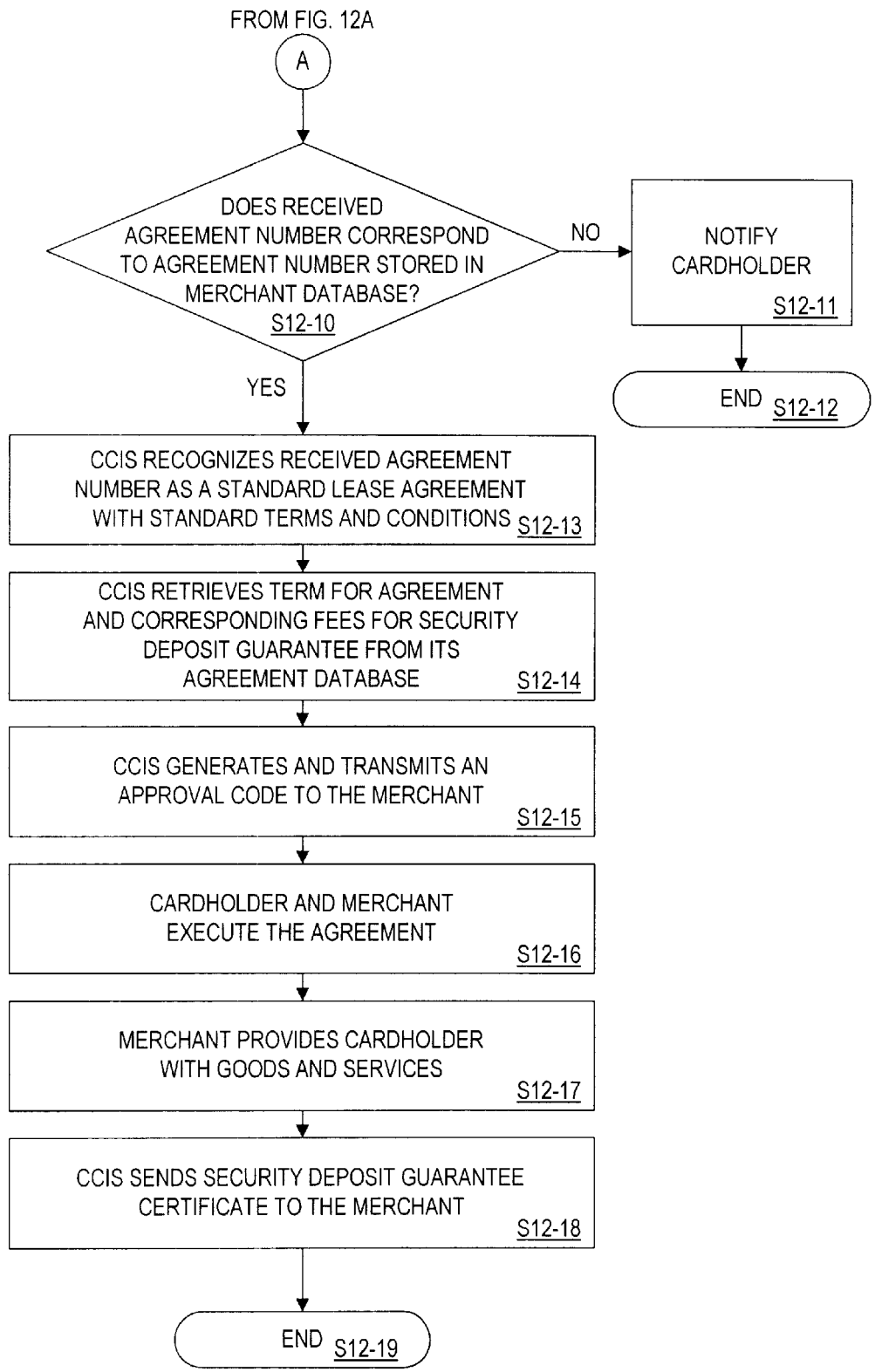
FIG. 12B is the conclusion of the flowchart of FIG. 12A.

Thereafter, processing proceeds to the top of FIG. 12B at Step S12-10.

At Step S12-10, the CCIS will automatically determine if the agreement number received from the merchant corresponds to an agreement number stored in its MERCHANT DATABASE (e.g., FIG. 4—Table 218 as described above). Such a determination can be carried out by an automatic database query and the like. If there is no correspondence, processing proceeds to Step S12-11 where the cardholder will be notified (as in the case of Step S12-7 as described above) and processing will thereafter end at Step S12-12.

If there is correspondence between the lease agreement number received from the merchant and the lease agreement found in the MERCHANT DATABASE, processing proceeds to Step 12-13. At Step S12-13, the CCIS will recognize the lease agreement number received from the merchant as a standard lease agreement containing standard terms and conditions and processing will proceed to Step S12-14.

At Step S12-14, the CCIS will automatically retrieve the term and corresponding processing fees for the standard lease agreement from its LEASE AGREEMENT DATABASE (FIG. 10—Table 1010) so that it can establish a security deposit guarantee.

Next, at Step S12-15, the CCIS will generate an approval code and it will transmit that approval code to the merchant for display by the POS terminal or manifestation through another communication medium (e.g., mail if the cardholder left the POS station). Thereafter, at Step S12-16, the cardholder and the merchant will execute the lease agreement which may be printed by a POS printer like a sales draft.

Accordingly, at Step S12-17, the merchant can provide the cardholder with either goods or services in the case of a personal property type lease agreements (e.g., a cellular phone) or keys to a rental property such as an apartment or the like.

Finally, at Step S12-18, the CCIS sends a security deposit guarantee certificate to the merchant to evidence the issuance of a binding security deposit guarantee (e.g., like in FIG. 6).

Processing ends at Step S12-19.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for issuing a security deposit guarantee, comprising:

a data storage system storing information about a credit card account having an account owner, and information relating to an agreement between said account owner and another party; and a data processing system coupled to said data storage system and operative to receive a request to issue a security deposit guarantee of a specified value, to issue said security deposit guarantee in accordance with said agreement between said account owner and said other party, and to update said credit card account based on said security deposit guarantee;

wherein said data processing system is further operative to issue a certificate including said security deposit guarantee.

2. The system according to claim 1, wherein said data processing system updates said credit card account by decreasing an available line of credit corresponding to said credit card account based on said specified value.

3. The system according to claim 2, wherein said data processing system decreases said available line of credit in an amount equal to said specified value.

4. The system according to claim 2, wherein said data processing system decreases said available line of credit in an amount less than said specified value.

5. The system according to claim 1, wherein said data processing system updates said credit card account by charging a fee to said credit card account for issuing said security deposit guarantee.

6. The system according to claim 1, wherein said request includes a term defining a certain number of periods during which said security deposit guarantee shall be effective, and said data processing system updates said credit card account by charging a periodic fee to said credit card account during each period of said certain number of periods, and said data processing system is further operative to issue a corresponding statement indicating each charge.

7. The system according to claim 1, wherein said agreement is a lease agreement requiring a security deposit and said other party is a landlord that will accept said security deposit guarantee in lieu of said security deposit.

8. The system according to claim 1, wherein said request includes a term during which said security deposit guarantee shall be effective.

9. The system according to claim 1, wherein said request includes a term during which said security deposit guarantee shall remain in effect and wherein said data processing system updates said credit card account by locking an available line of credit corresponding to said credit card account based on said specified value, said data processing system unlocking said available line of credit after said term.

10. The system according to claim 1, wherein said data processing system is further operative to receive a request to honor said security deposit guarantee by causing a payment up to said specified value to be made to said other party.

11. The system according to claim 1, wherein said security deposit guarantee includes a guaranteed value, said guaranteed value based on said specified value.

12. The system according to claim 1, wherein said security deposit guarantee includes a guaranteed value, said guaranteed value being equal to said specified value.

13. The system according to claim 1, wherein security deposit guarantee is issued in accordance with said request based on a set of credit card account parameters including an available amount of credit corresponding to said credit card account.

14. A system for generating a security deposit guarantee, comprising:
   a data storage system storing information relating to an account having an available line of credit and to an agreement; and
   a data processing system coupled to said data storage system and operative to receive a request to generate a security deposit guarantee, said request specifying a value to correspond to said security deposit guarantee, said data processing system further operative to process said information relating to said account to determine if said available line of credit can accommodate said value and to generate said security deposit guarantee based on said agreement when said available line of credit can accommodate said value;
   wherein said data processing system is further operative to issue a certificate including said security deposit guarantee.

15. The system according to claim 14, wherein said account is a credit card account.

16. The system according to claim 14, wherein said data processing system generates said security deposit guarantee by freezing said available line of credit corresponding to said account based on said value.

17. The system according to claim 14, wherein said agreement is a lease agreement requiring a security deposit.

18. The system according to claim 14, wherein said request includes a term during which said security deposit guarantee shall be effective.

19. The system according to claim 14, wherein said data processing system is further operative to charge a fee to said account for issuing said security deposit guarantee.

20. The system according to claim 14, wherein said request includes a term defining a certain number of periods during which said security deposit guarantee shall be effective, and said data processing system is further operative to charge a periodic fee to said account during each period of said certain number of periods and to issue a statement indicating each charge.

21. The system according to claim 14, wherein said request includes a term during which said security deposit guarantee shall remain in effect and wherein said data processing system establishes said security deposit guarantee by locking said available line of credit based on said value, said data processing system unlocking said available line of credit after said term.

22. The system according to claim 14, wherein said data processing system is further operative to receive a request to honor said security deposit guarantee by causing a payment up to said value to be made to a beneficiary of said security deposit guarantee.

23. The system according to claim 14, wherein said security deposit guarantee includes a guaranteed value, said guaranteed value based on said value specified in said request.

24. The system according to claim 14, wherein said security deposit guarantee includes a guaranteed value, said guaranteed value being equal to said value specified in said request.

25. The system according to claim 14, wherein said security deposit guarantee is generated based on a set of parameters comprising said available line of credit and a credit rating corresponding to said account.

26. The system according to claim 14, wherein said data processing system is further operative to receive a request to honor said security deposit guarantee and to make a payment to a holder of said security deposit guarantee in accordance with said value.

27. The system according to claim 26, wherein said payment is equal to said value.

28. The system according to claim 26, wherein said payment is less than said value.

29. A system for generating a security deposit guarantee based on an available line of credit corresponding to a credit card account, comprising:
   a data storage system storing information relating to a credit card account belonging to a cardholder and having an available line of credit, and to an agreement, said agreement to being formed between said cardholder and a third party; and
   a data processing system coupled to said data storage system and operative to receive a request from said cardholder to establish a security deposit guarantee, said request specifying a value to correspond to said security deposit guarantee, said data processing system further operative to process said information relating to said credit card account to determine if said available line of credit can accommodate said value and to issue said security deposit guarantee based on said agreement when said available line of credit can accommodate said value;
   wherein said data processing system is further operative to issue a certificate including said security deposit guarantee.

30. The system according to claim 29, wherein said data processing system issues said security deposit guarantee after freezing said available line of credit based on said value.

31. The system according to claim 29, wherein said agreement is a lease agreement requiring a security deposit.

32. The system according to claim 29, wherein said request includes a term during which said security deposit guarantee shall be effective.

33. The system according to claim 29, wherein said data processing system is further operative to charge a fee to said credit card account for issuing said security deposit guarantee.

34. The system according to claim 29, wherein said request includes a term defining a certain number of periods during which said security deposit guarantee shall be effective, and said data processing system is further operative to charge a periodic fee to said credit card account during each period of said certain number of periods and to issue a periodic credit card billing statement indicating each periodic fee charged to said credit card account.

35. The system according to claim 29, wherein said request includes a term during which said security deposit guarantee shall remain in effect and said data processing system issues said security deposit guarantee after locking said available line of credit based on said value, said data processing system unlocking said available line of credit after said term.

36. The system according to claim 29, wherein said data processing system is further operative to receive a request to honor said security deposit guarantee by causing a payment up to said value to be made to said third party.

37. A computer-implemented process for issuing a security deposit guarantee, comprising the steps of:

storing information about a credit card account having an account owner, and an agreement between said account owner and another party;

receiving a request to issue a security deposit guarantee of a specified value;

issuing said security deposit guarantee in accordance with said agreement between said account owner and said other party;

updating said credit card account based on said security deposit guarantee; and issuing a certificate including said security deposit guarantee.

38. The process according to claim 37, wherein said updating step includes decreasing an available line of credit corresponding to said credit card account based on said specified value.

39. The process according to claim 37, wherein said updating step further includes the step of charging a fee to said credit card account for issuing said security deposit guarantee.

40. The process according to claim 37, wherein said agreement is a lease agreement requiring a security deposit and said other party is a landlord that will accept said security deposit guarantee in lieu of said security deposit.

41. The process according to claim 37, wherein said request includes a term during which said security deposit guarantee shall be effective.

42. A computer-implemented process for generating a security deposit guarantee, comprising the steps of:

storing information about an agreement and a credit card account, said credit card account belonging to a cardholder and having an available line of credit;

receiving a request to generate a security deposit guarantee, said request specifying a value to correspond to said security deposit guarantee;

processing said information about said account to determine if said available line of credit can accommodate said value;

decreasing said available line of credit of said credit card account based on said value;

generating said security deposit guarantee based on said agreement when said available line of credit can accommodate said value;

issuing said security deposit guarantee to said cardholder; and issuing a certificate to said cardholder, said certificate including said security deposit guarantee.

43. The process according to claim 42, wherein said agreement is a lease agreement requiring a security deposit.

44. The process according to claim 42, wherein said request includes a term during which said security deposit guarantee shall be effective.

45. The process according to claim 42, further comprising the step charging a fee to said account for issuing said security deposit guarantee.

46. The process according to claim 42, further comprising the step of receiving a request to honor said security deposit guarantee by causing a payment up to said value to be made to a beneficiary of said security deposit guarantee.

47. A process for accepting a security deposit guarantee issued by a credit card account issuer, comprising the steps of:

requesting a security deposit of a specified value; and receiving a security deposit guarantee in lieu of said security deposit from a cardholder, said security deposit guarantee being secured by an available line of credit corresponding to a credit card account belonging to said cardholder and being maintained by a credit card account issuer;

wherein said requesting and receiving steps are carried out by a landlord.

48. The process according to claim 47, further comprising the step of requesting said credit card issuer to transfer funds corresponding to said specified value.

49. The process according to claim 48, wherein said request to transfer funds includes an amount equal to said specified value.

50. The process according to claim 48, wherein said request to transfer funds includes an amount less than said specified value.

51. A computer-implemented process for accepting a security deposit guarantee issued by a credit card account issuer, comprising the steps of:

in the context of a rental agreement, requesting a security deposit payment of a specified value; and receiving a security deposit guarantee in lieu of said security deposit from a cardholder, said security deposit guarantee being issued by a credit card account issuer and secured by a lock of a predetermined value against an available line of credit corresponding to a credit card account belonging to said cardholder and being maintained by said credit card account issuer.

52. The process according to claim 51, wherein said requesting and receiving steps are carried out by a landlord.

53. The process according to claim 51, further comprising the step of requesting said credit card issuer to transfer funds corresponding to said predetermined value.

54. The process according to claim 53, wherein said request to transfer funds includes an amount equal to said predetermined value.

55. The process according to claim 53, wherein said request to transfer funds includes an amount less than said predetermined value.

56. A computer-implemented process for obtaining a security deposit guarantee, comprising the steps of:

establishing a credit card account with a credit card issuer, said credit card account having an available line of credit;

requesting a security deposit guarantee having a specified value from said credit card issuer, said security deposit guarantee to be generated by said credit card issuer in accordance with an agreement to be formed between a cardholder corresponding to said credit card account and a third party;

receiving said security deposit guarantee from said credit card issuer, said available line of credit being decreased by said specified value; and providing said security deposit guarantee to said third party in lieu of a security deposit and in accordance with said agreement.

57. The process according to claim 56, further comprising the step of remitting a service fee to said credit card account issuer for said security deposit guarantee.

58. The process according to claim 56, further comprising the step of periodically remitting a corresponding periodic service fee to said credit card account issuer for said security deposit guarantee.

59. A system for generating a security deposit guarantee, comprising:

a data storage system storing information about a credit card account having an account owner, and an agreement including terms and conditions between said account owner and another party;

a data processing system coupled to said data storage system and operative to receive a request to issue a security deposit guarantee of a specified value, to produce said security deposit guarantee request in accordance with said terms and conditions of said agreement between said account owner and said other party, to update said credit card account based on said security deposit guarantee, and to send said security deposit guarantee to a production system coupled to said data processing system, said production system operative to receive said security deposit guarantee and to produce a security deposit guarantee certificate including said security deposit guarantee.

60. The system according to claim 59, wherein said production system is operated by said account owner remotely from said data processing system.

61. The system according to claim 59, wherein said production system is further coupled to a personal computing station operated by said account owner.

62. The system according to claim 59, wherein said data processing system updates said credit card account by decreasing an available line of credit corresponding to said credit card account based on said specified value.

63. The system according to claim 62, wherein said data processing system decrements said available line of credit in an amount equal to said specified value.

64. The system according to claim 62, wherein said data processing system decrements said available line of credit in an amount less than said specified value.

65. The system according to claim 59, wherein said data processing system updates said credit card account by charging a fee to said credit card account for issuing said security deposit guarantee.

66. The system according to claim 59, wherein said request includes a term defining a certain number of periods during which said security deposit guarantee shall be effective, and said data processing system updates said credit card account by charging a periodic fee to said credit card account during each period of said certain number of periods, and said data processing system is further operative to issue a corresponding statement to said account owner indicating each charge.

67. The system according to claim 59, wherein said agreement is a lease agreement requiring a security deposit and said other party is a landlord that will accept said security deposit guarantee in lieu of said security deposit.

68. The system according to claim 59, wherein said request includes a term during which said security deposit guarantee shall be effective.

69. The system according to claim 59, wherein said request includes a term during which said security deposit guarantee shall remain in effect and wherein said data processing system updates said credit card account by decreasing an available line of credit corresponding to said credit card account based on said specified value, said data processing system unlocking said available line of credit after said term.

70. The system according to claim 59, wherein said data processing system is further operative to receive a request to honor said security deposit guarantee by causing a payment up to said specified value to be made to said other party.

71. The system according to claim 59, wherein said security deposit guarantee includes a guaranteed value, said guaranteed value based on said specified value.

72. The system according to claim 59, wherein said security deposit guarantee includes a guaranteed value, said guaranteed value being equal to said specified value.

73. The system according to claim 59, wherein security deposit guarantee is issued in accordance with said request based on a set of credit card account parameters including an available amount of credit corresponding to said credit card account and a credit rating corresponding to said credit card account.

74. A system for issuing a security deposit guarantee, comprising:

a data storage system storing information about a predefined agreement requiring a security deposit; and a data processing system coupled to said data storage system and operative to receive a request to issue a security deposit guarantee in accordance with said predefined agreement, said request including an agreement identifier identifying said predefined agreement and an account identifier identifying an account, said data processing system further operative to issue said security deposit guarantee in accordance with said predefined agreement, and to cause said account to be updated based on said security deposit guarantee;

wherein said data processing system is further operative to issue a certificate including said security deposit guarantee.

75. The system according to claim 74, wherein said data processing system causes said account to be updated by causing an available line of credit associated with said account to be decreased in accordance with said security deposit guarantee.

76. The system according to claim 74, wherein said data processing system causes said account to be updated by charging a fee to said account for issuing said security deposit guarantee.

77. The system according to claim 74, wherein said predefined agreement is a lease agreement requiring a security deposit.

78. The system according to claim 74, wherein said certificate is a remotely printed paper form.

79. The system according to claim 74, wherein said account identifier is a credit card number and said account is a credit card account.

80. A computer-implemented process for issuing a security deposit guarantee, comprising the steps of:

storing information about a predefined agreement requiring a security deposit;

receiving a request to issue a security deposit guarantee in accordance with said predefined agreement, said request including an agreement identifier identifying said predefined agreement and an account identifier identifying an account;

issuing said security deposit guarantee in accordance with said predefined agreement;

causing said account to be updated based on said security deposit guarantee; and issuing a certificate including said security deposit guarantee.

81. The process according to claim 80, wherein said causing step causes said account to be updated by decreasing an available line of credit associated with said account in accordance with said security deposit guarantee.

82. The process according to claim 80, wherein said causing step causes said account to be updated by charging a fee to said account.

83. The process according to claim 80, wherein said certificate is a remotely printed paper form.

84. The process according to claim 80, wherein said account identifier is a credit card number and said account is a credit card account.

85. A computer-implemented method for processing a security deposit guarantee, comprising the steps of:

retrieving information related to a security deposit guarantee from a data storage device, said security deposit guarantee having been previously issued based on a credit card account owned by a cardholder and in the context of an agreement between said cardholder and another party, said information including a term during which said security deposit guarantee shall be active and a maximum claim value;

determining from said term if said security deposit guarantee will remain active during a period of time;

causing a fee to be charged to said credit card account when said security deposit guarantee will remain active during said period of time;

generating a plurality of termination notices when said security deposit guarantee is determined not to be active during said period of time; and distributing said plurality of termination notices to said cardholder and to said other party.

86. The method according to claim 85, further comprising the steps of:

causing a payment to be made to said other party when said other party makes a claim based on said security deposit guarantee in accordance with said maximum claim value; and causing a charge to be made to said credit card account in accordance with said claim and said maximum claim value.

87. The method according to claim 85, wherein said fee is a monthly fee that is to be charged to said credit card account during each month that said security deposit guarantee is active.

88. The method according to claim 85, wherein said retrieving, determining, and causing steps are carried out by a credit card issuer.

89. A system for processing a security deposit guarantee, comprising:

a data storage system storing information related to a security deposit guarantee, said information including a term during which said security deposit guarantee shall be active and a maximum claim value, said security deposit guarantee having been previously issued based on a credit card account owned by a cardholder and in the context of an agreement between said cardholder and another party; and a data processing system coupled to said data storage system and operative to determine from said term if said security deposit guarantee will remain active during a period of time, and to cause a fee to be charged to said credit card account when said security deposit guarantee will remain active during said period of time;

wherein said data processing system is further operative to generate a plurality of termination notices when said security deposit guarantee is determined not to be active during said period of time, and to cause said plurality of termination notices to be distributed to said cardholder and to said other party.

90. The system according to claim 89, wherein said plurality of termination notices are distributed electronically to said cardholder and to said other party.

91. The system according to claim 89, wherein said plurality of termination notices are distributed to said cardholder and said other party via a post service.

92. The system according to claim 89, wherein said cardholder receives a termination notice from said plurality of termination notices in a periodic billing statement corresponding to said credit card account to be submitted to said cardholder.

93. The system according to claim 89, wherein said data processing system is further operative to cause a payment to be made to said other party when said other party makes a claim based on said security deposit guarantee in accordance with said maximum claim value, and to cause a charge to be made to said credit card account in accordance with said claim and said maximum claim value.

* * * * *